US011643125B2

(12) United States Patent
Gamache et al.

(10) Patent No.: US 11,643,125 B2
(45) Date of Patent: May 9, 2023

(54) DOLLY FOR ATTACHMENT TO A VEHICLE HITCH

(71) Applicant: Inotev Inc., Adstock (CA)

(72) Inventors: Yves Gamache, Adstock (CA); Etienne Couture, St-Georges (CA)

(73) Assignee: Inotev Inc., Adstock (CA)

( * ) Notice: Subject to any disclaimer, the term of this patent is extended or adjusted under 35 U.S.C. 154(b) by 575 days.

(21) Appl. No.: 16/626,821

(22) PCT Filed: Jul. 6, 2018

(86) PCT No.: PCT/CA2018/050826
§ 371 (c)(1),
(2) Date: Dec. 26, 2019

(87) PCT Pub. No.: WO2019/006557
PCT Pub. Date: Jan. 10, 2019

(65) Prior Publication Data
US 2020/0130722 A1    Apr. 30, 2020

Related U.S. Application Data

(60) Provisional application No. 62/529,500, filed on Jul. 7, 2017.

(51) Int. Cl.
*B62B 5/00* (2006.01)
*B62B 5/06* (2006.01)
(52) U.S. Cl.
CPC ............ *B62B 5/0003* (2013.01); *B62B 5/067* (2013.01); *B62B 2205/12* (2013.01)
(58) Field of Classification Search
CPC ......... B62B 5/0003; B62B 5/067; B62B 1/00; B62B 3/025; B62B 2205/12

USPC ................................................... 280/401, 43
See application file for complete search history.

(56) References Cited

U.S. PATENT DOCUMENTS

| 3,612,600 A | * | 10/1971 | Salichs | ............... | B62D 63/061 |
| | | | | | 296/181.7 |
| 6,585,285 B2 | * | 7/2003 | Koch | ................... | B62D 63/061 |
| | | | | | 280/789 |
| 6,773,025 B1 | * | 8/2004 | Zelm | ................... | B62D 63/061 |
| | | | | | 280/648 |

(Continued)

OTHER PUBLICATIONS

International Search Report. Patent Cooperation Treaty. dated Sep. 18, 2018.

(Continued)

*Primary Examiner* — Hau V Phan
(74) *Attorney, Agent, or Firm* — Vedder Price P.C.

(57) ABSTRACT

A dolly for attachment to a vehicle hitch is disclosed. The dolly includes a connection assembly for connecting and disconnecting the dolly to the vehicle hitch. The connection assembly also allows to position the dolly from a ramp position in which the support surface is inclined, to a loading position in which the support surface is raised and parallel to the ground, for loading the object from the dolly to the vehicle. The connection assembly also allows to position the dolly from the loading position to a transport position. In the transport position, the support surface is upright and extends along the rear of the vehicle, for transporting the dolly with the vehicle, once the object has been loaded in the vehicle. A method of operating the dolly is also provided.

21 Claims, 26 Drawing Sheets

(56) References Cited

U.S. PATENT DOCUMENTS

| | | | | |
|---|---|---|---|---|
| 6,846,017 B2* | 1/2005 | Martin | ............... | B60R 9/06 |
| | | | | 224/524 |
| 7,543,842 B1* | 6/2009 | Fiorini | ............... | B62B 3/025 |
| | | | | 280/43 |
| 7,905,508 B2* | 3/2011 | Crawford | ............... | B62B 5/0003 |
| | | | | 224/524 |
| 7,997,605 B2* | 8/2011 | Kittrell | ............... | B60D 1/54 |
| | | | | 280/789 |
| 8,696,012 B2* | 4/2014 | Oyasaeter | ............... | B62D 63/061 |
| | | | | 280/491.4 |
| 9,216,698 B2* | 12/2015 | Rhodes | ............... | B60R 9/065 |
| 9,375,986 B1* | 6/2016 | Dykstra | ............... | B62B 1/00 |
| D775,764 S * | 1/2017 | Prat-Pfister | ............... | D28/13 |
| 9,573,639 B1* | 2/2017 | Furtado | ............... | B62D 63/061 |
| 2004/0032114 A1 | 2/2004 | Hagen | | |
| 2006/0103094 A1 | 5/2006 | Wiff et al. | | |
| 2007/0001431 A1* | 1/2007 | Fiorini | ............... | B62D 63/064 |
| | | | | 280/656 |
| 2008/0111348 A1* | 5/2008 | Lawson | ............... | B60D 1/143 |
| | | | | 280/504 |
| 2009/0212515 A1* | 8/2009 | Oyasaeter | ............... | B62D 63/062 |
| | | | | 280/40 |
| 2009/0232633 A1* | 9/2009 | Stamps | ............... | B66F 7/08 |
| | | | | 280/423.1 |
| 2010/0066069 A1* | 3/2010 | Bradshaw | ............... | B60R 9/06 |
| | | | | 280/769 |

OTHER PUBLICATIONS

Written Opinion of the International Searching Authority. Patent Cooperation Treaty. dated Sep. 18, 2018.

* cited by examiner

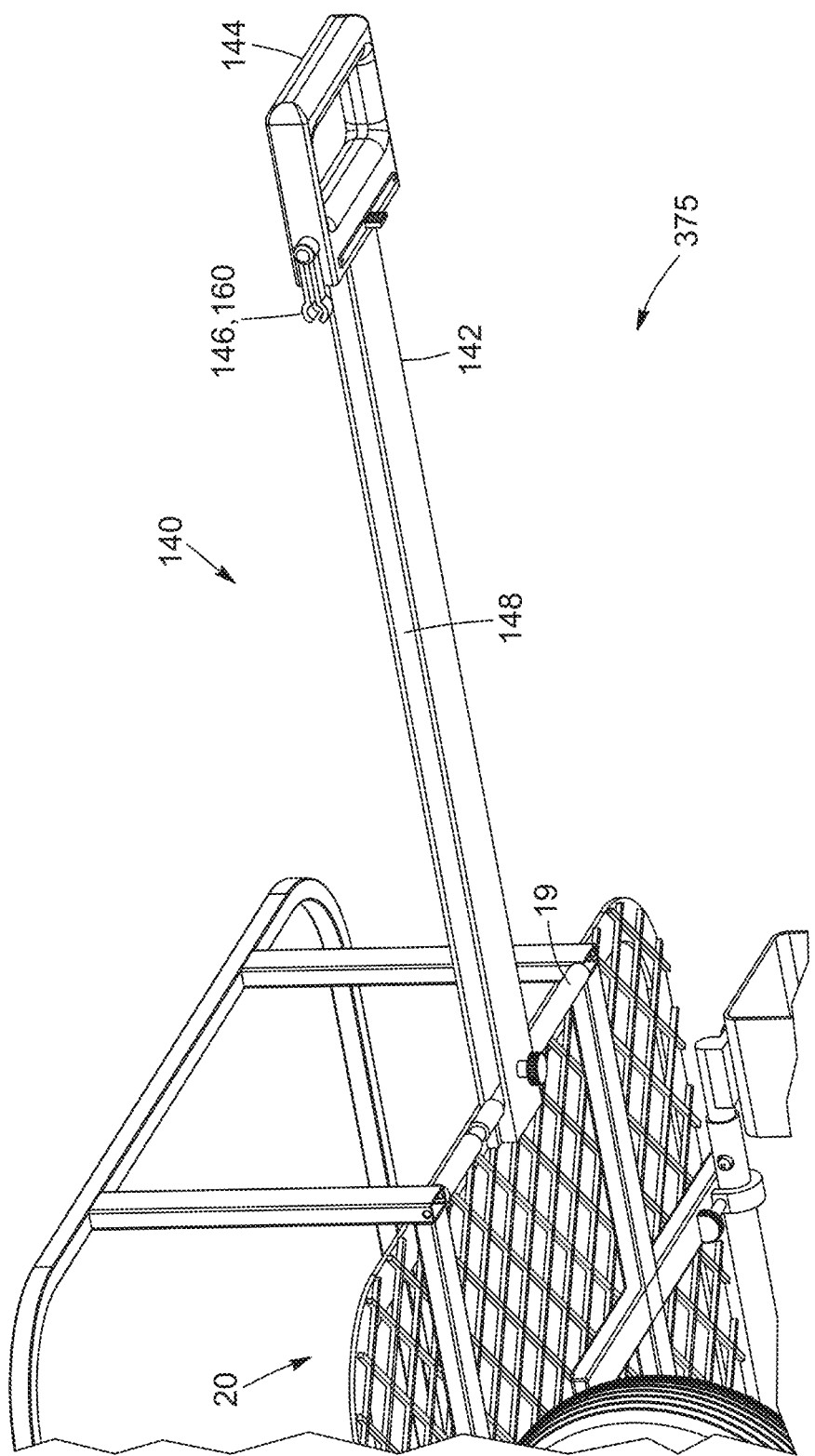

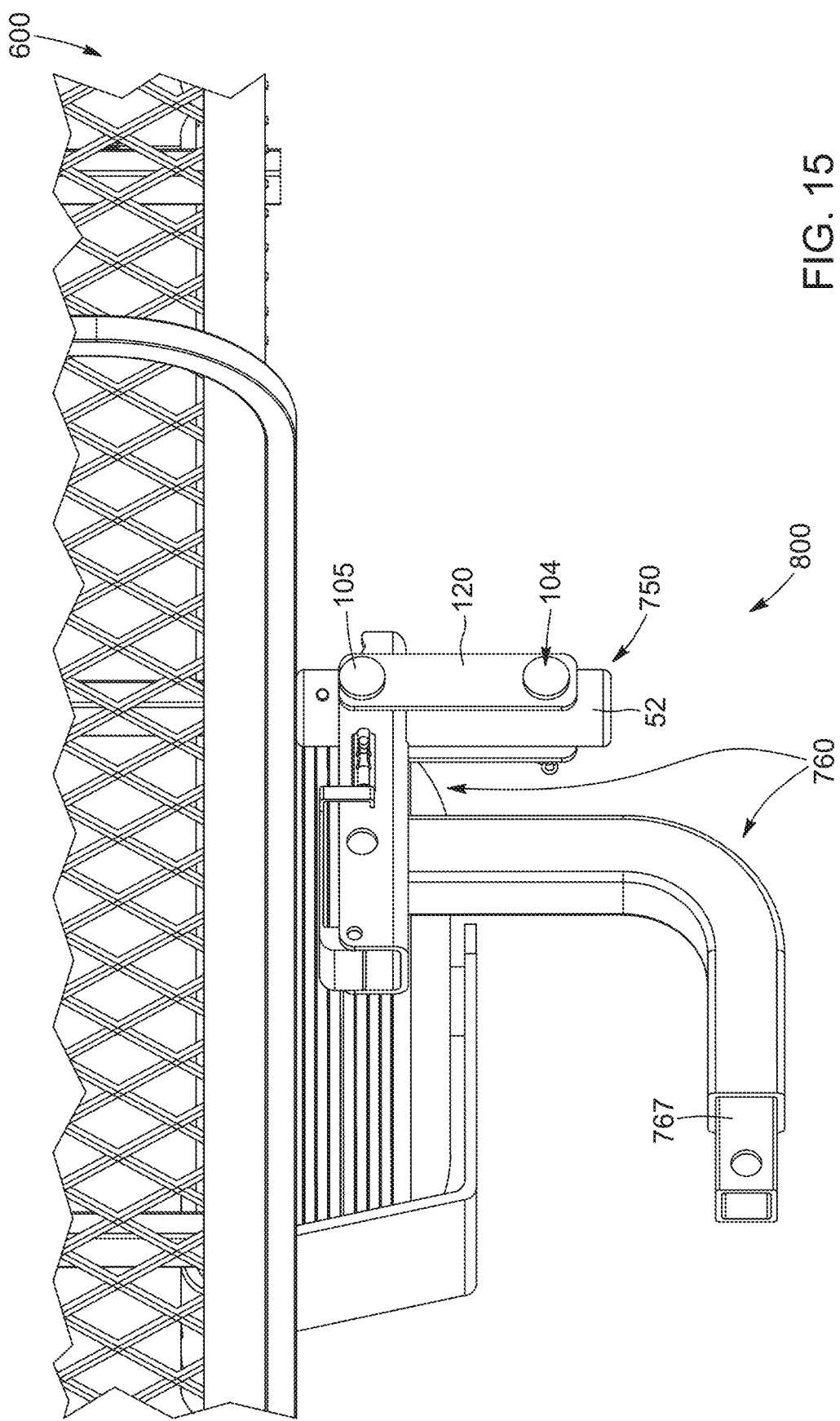

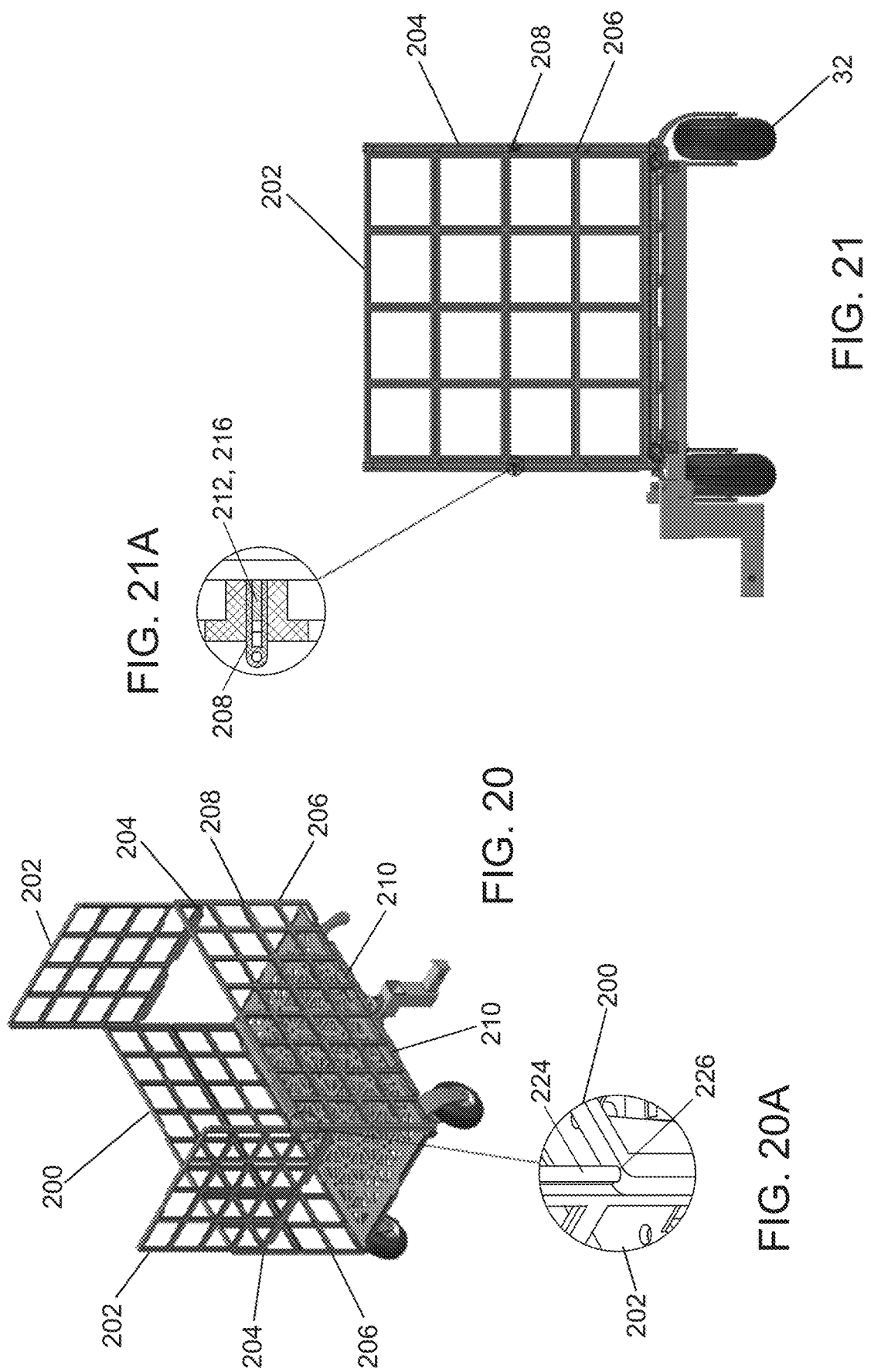

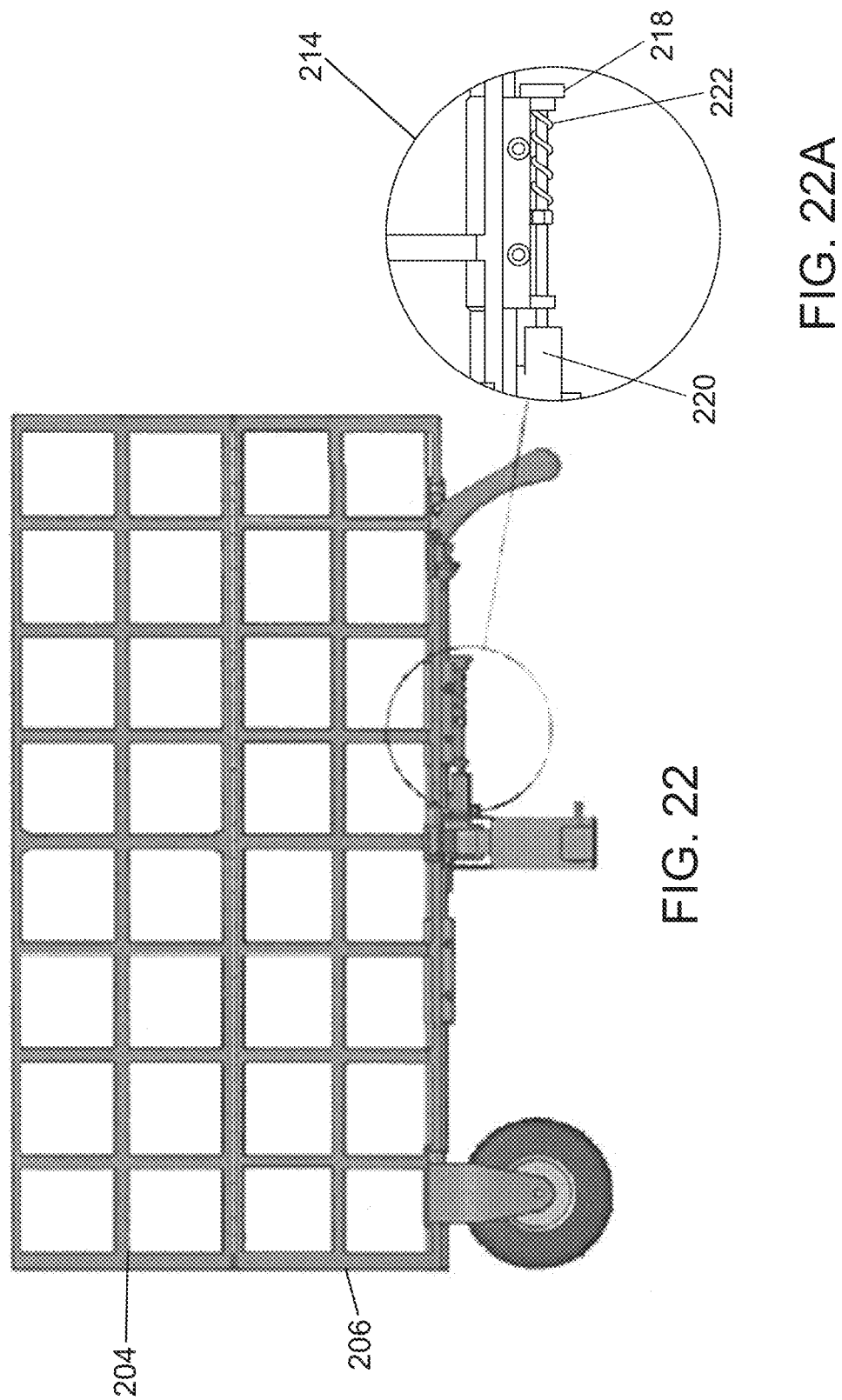

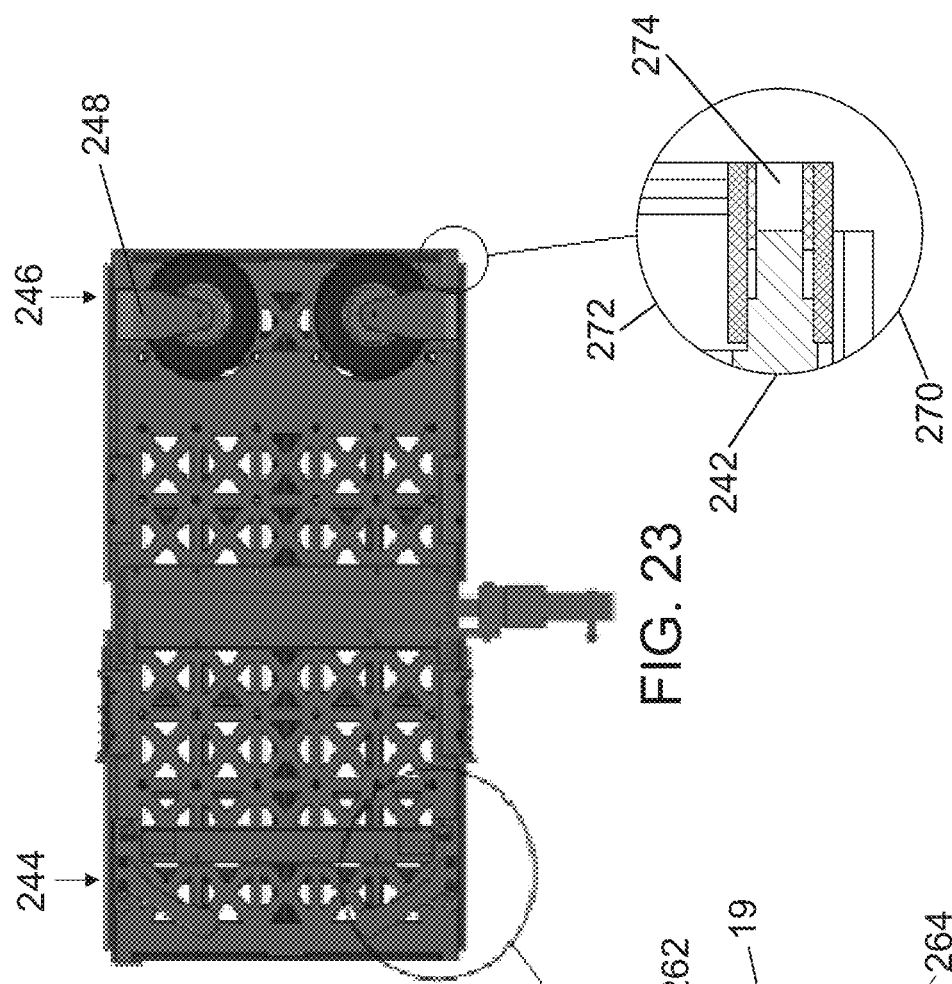
FIG. 23
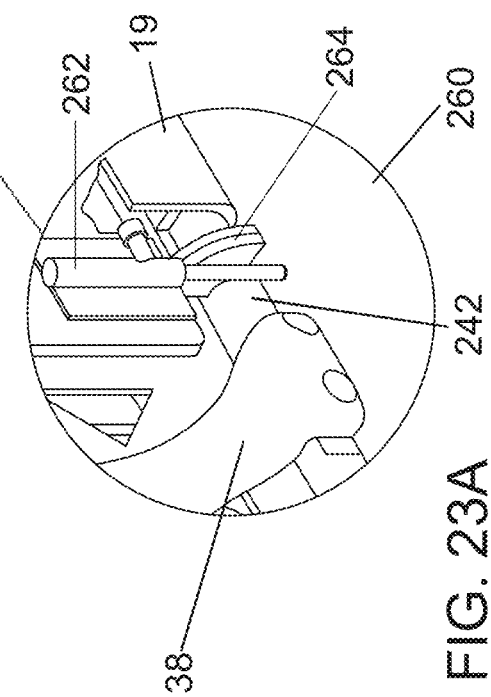
FIG. 23A
FIG. 23B

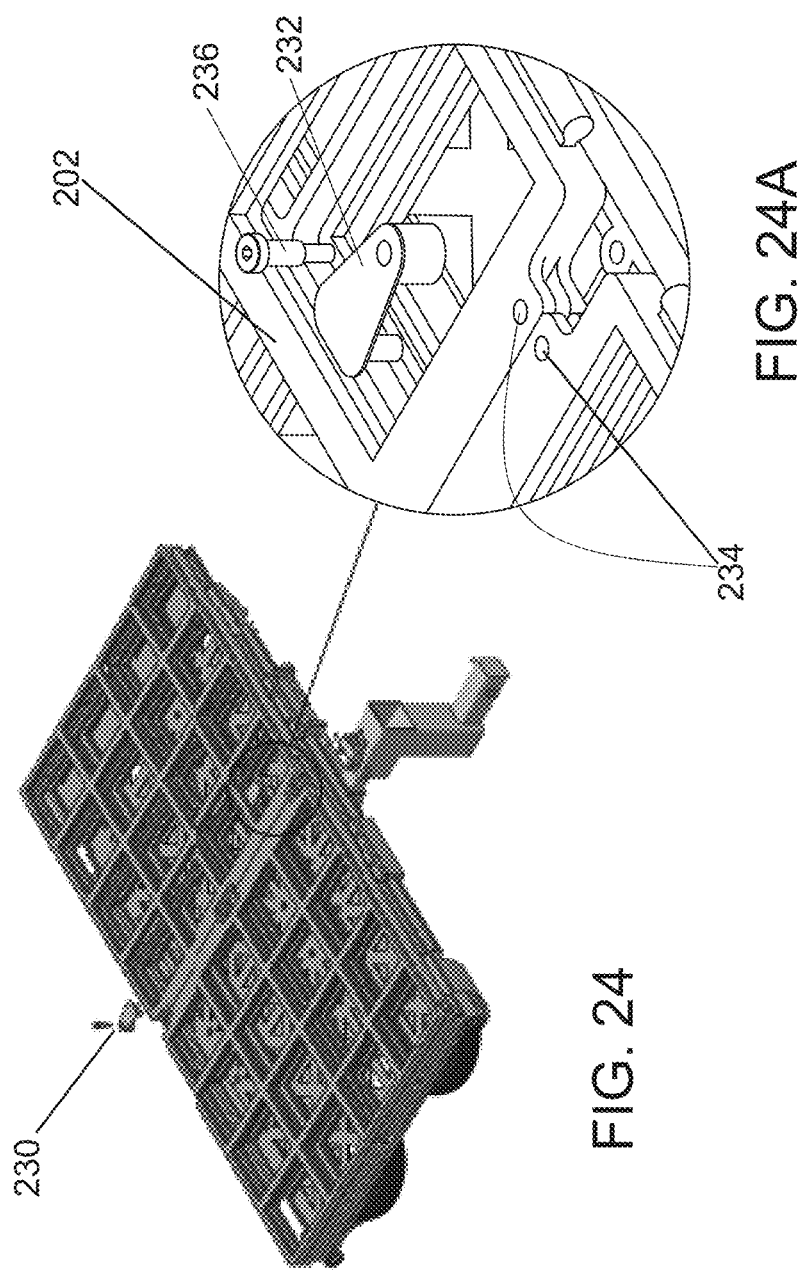

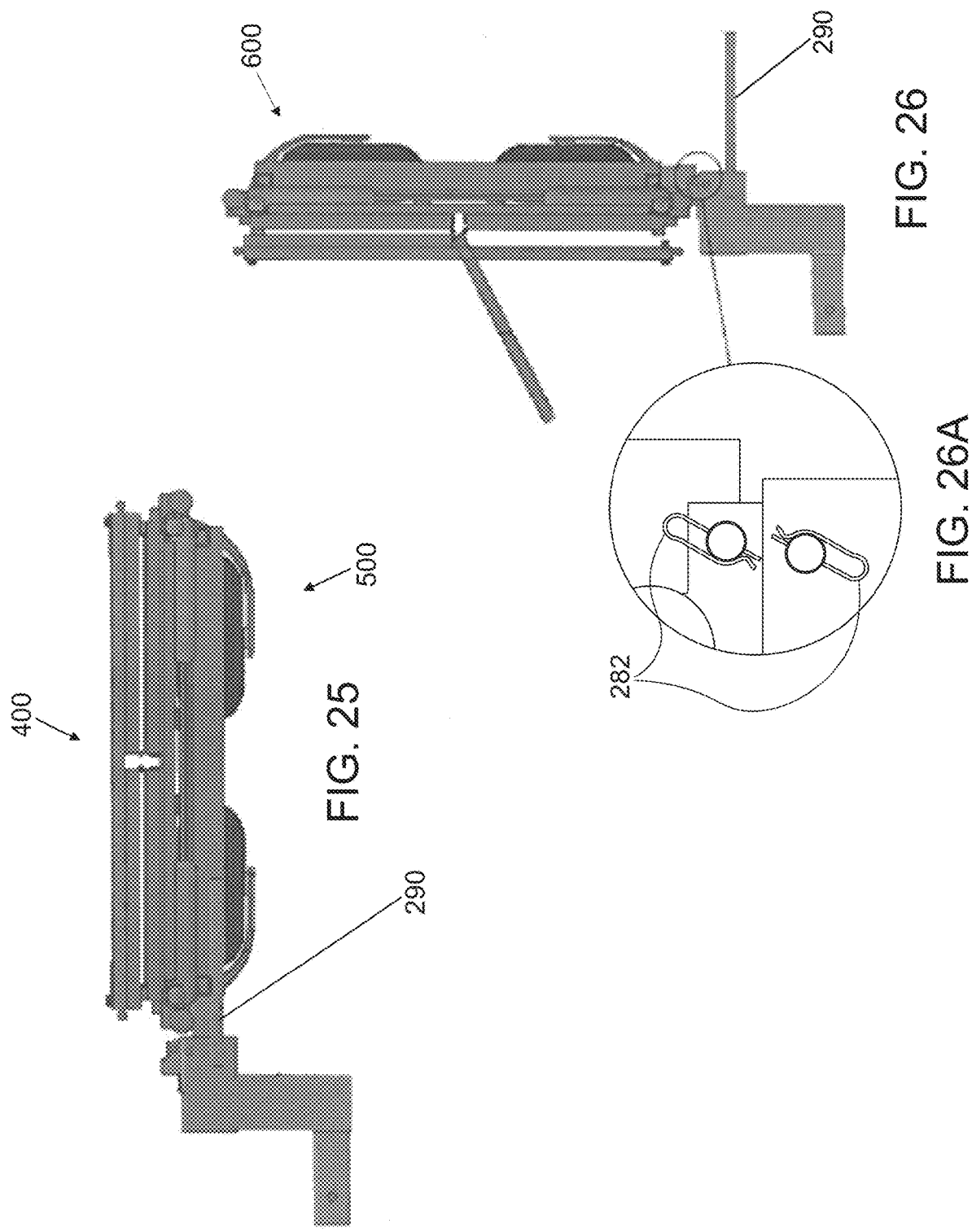

DOLLY FOR ATTACHMENT TO A VEHICLE HITCH

TECHNICAL FIELD

The technical field generally relates to dollies and cargo platforms. In particular, it relates to a dolly for attachment to a vehicle hitch.

BACKGROUND

Transporting large objects can be facilitated with the use dollies, trailers or hand carts, which can provide mechanical leverage to a user for manipulating such objects. A dolly typically consists of a frame with wheels provided at one end thereof and mounted on an axle such that when the dolly is lifted or tilted at the other end by the user it may be carted about, with the weight of the load being borne by the wheels. Once so tilted, the dolly can then be rolled about with the object supported thereon, such that the object can be moved with significantly less effort required from the user.

For transporting large objects over a greater distance, a personal vehicle, such as an automobile, is often employed. For example, a large object can be loaded from the dolly into the trunk or the cabin of the automobile which is then driven to a destination where the object is unloaded.

However, one drawback with moving large objects with the assistance of automobiles, is that while the dolly may be used to move the object to a position adjacent to the automobile before it is loaded, due to the limited cargo space of the automobile, the dolly itself cannot be easily transported along with the object for subsequent use after the automobile has reached its ultimate destination. The automobile may not be sufficiently spacious to accommodate both the object to be transported and the dolly in the cargo space of the trunk or the cabin of the vehicle. In some cases, the object's dimensions are such that it cannot pass through the frame of the vehicle and into such cargo spaces. This scenario is especially prevalent with compact vehicles where space within is often limited since the vehicle is specifically designed not to have large cargo areas.

Additionally, when using a dolly to move the object into a position adjacent to the car prior to loading, the dolly cannot assist the user with vertical displacement of the object to a height at which the object can be loaded into the vehicle, in other words, the user must bear the full burden of any required lifting of the object. Furthermore, some objects may be awkward to load into the cabin or truck due to, for example, an object closely matching the dimension of the entranceway to the cabin or the trunk.

There exists in the prior art, cargo platforms which can be retrofitted to an automobile via a standard trailer hitch to provide a convenient cargo zone, exterior to the automobile, upon which an object can be placed, secured, and transported.

Such prior art hitch mounted platforms are positioned lower to the ground compared to a trunk, but still require the user to lift the large object to a certain height, which often places stress on the user's body, for example on the user's back. Even if such platforms are lower to the ground compared to a standard trunk, it may still be difficult to transfer the object from the dolly to the platform, especially if the object is heavy, awkward to handle, and/or if the user is of limited physical ability. Furthermore, another drawback of such prior art cargo platforms is that they are limited in size and may not be able to accommodate both the object to be transported as well as the dolly used to bring the object to a position adjacent to the platform for subsequent use after the vehicle has reached its destination.

There is therefore a need for a dolly able to overcome at least some of the shortcomings of the prior art.

SUMMARY

According to an aspect, a dolly for attachment to a vehicle hitch is provided. The dolly comprises a support assembly including a support surface, the support assembly comprising two ends and two lateral sides. The dolly also comprises at least one wheel operatively connected or provided near one of the ends of the support assembly. The dolly can also comprise or be used in combination with a connection assembly which includes a dolly component and a hitch component. The hitch component has one end connectable to the vehicle hitch and a second end removably engageable with the dolly component. The dolly component is operatively connected to the support assembly. The connection assembly allows, when the dolly and hitch components are engaged, and the hitch component is connected to the vehicle hitch, to move the dolly in different positions. The dolly can be moved between a ramp position and a loading position, and also from the loading position to a transport position. In the ramp position, the support surface is inclined relative to the ground, while in the loading position, the support surface is parallel and raised above the ground. In the transport position, the support surface extends vertically relative to the ground, for transporting the dolly.

In some embodiments, movement of the dolly from the ramp position to the loading position is a pivoting movement about a first axis which extends along a length of the vehicle. Movement of the dolly from the loading position to the transport position may also be a rotational movement about a second axis which extends along a width of the vehicle.

Preferably, the connection assembly comprises locking mechanism for locking the dolly in the loading position and in the transport position.

In some embodiments, the dolly component comprises a projection extending from one the lateral sides of the support assembly. The second end of the hitch assembly, which is removably engageable with the dolly component, may include two segments at angle: a first and a second segments. The first and second segments are preferably at right angle from one another. The first segment extends parallel to the ground when the first end of the hitch assembly is connected to the hitch, and the projection is securable to the first section when the dolly is in the loading position. The second segment extends perpendicular to the ground when the first end of the hitch assembly is connected to the hitch, and the projection is securable to the second segment when the dolly is in the transport position.

In a possible embodiment, the projection may be provided with a projection groove. In this case, the connection assembly may include a rotation pin insertable through the projection groove, to guide rotation of the projection when moving the dolly between the loading and the transport position. It is also possible to provide a locking pin, insertable to the projection groove, to secure the projection to the first segment or the second segment, depending on whether the dolly is in the loading position or in the transport position.

In some embodiment, an anti-tilting bar to restrict rotational movement of the dolly about the axis of the projection in one direction can be provided.

In some possible embodiments, connection assembly may include a latch and catch assembly. In this case, the dolly component of the connection assembly corresponds to a catch assembly, operatively secured to the support assembly. The catch assembly may comprise a projection defining a projection axis. The hitch component of the connection assembly corresponds to a latch assembly. The latch assembly comprises a first end connectable to the vehicle hitch and a second end, configured to removably latch onto the catch assembly and allow pivoting or rotational movement of the dolly via the projection. The latch assembly may include a clamp engageable with the catch assembly, the clamp comprising a locking mechanism configured to secure the projection within the latch assembly.

In some embodiments, the support assembly may comprise at least one barrier or wall(s) for confining the object to the support surface. The at least one upstanding barrier may be collapsible onto the support surface, such that the dolly be configurable between a deployed configuration wherein the at least one upstanding barrier is raised, and a collapsed configuration, wherein the at least one upstanding barrier is lowered on the support surface.

Optionally, the at least one wheel is part of a wheel assembly, which is configurable between a rolling position and a stored position. In the rolling position, the wheel axis preferably extends parallel to the support surface, and in the stored position, the wheel axis preferably extends perpendicular to the support surface.

In some embodiments, the dolly may include two wheels. The dolly may also include two wheel shafts, which are pivotable relative to the lateral sides of the support assembly. Each wheel shaft may include a handle at a first end thereof and one of said two wheels at a second end thereof, the wheel shafts being pivotable between an operating position in which the handle and wheel extend away from the support surface, and a collapsed position in which the wheel and handle lie flat along the support surface.

In other embodiments, the dolly may include four wheels. The dolly may include two wheel-shafts pivotally secured on the support assembly, each wheel shaft comprising a pair of wheels, the wheel shafts being pivotable between an operating position in which the pair of wheels extend away from the support surface, and a collapsed position in which the pair of wheels lie flat along the support surface.

It is also possible that one of the hitch component and the dolly component of the connection assembly be configurable between an extended configuration and retracted configuration, for positioning the dolly closer or farther away from the vehicle, when the dolly is connected to the hitch. For example, the connection assembly may include a telescoping member, configurable between an extended and retracted configuration, for spacing the dolly closer or farther away from the vehicle, when the dolly is connected to the hitch.

In some embodiments, a handle assembly operatively connected to the support assembly can be provided. The handle assembly includes a handle arm pivotally connected at one of the ends of the dolly, and configurable between a stored position where the handle arm is slid under the support surface, substantially parallel thereto, and a deployed position where the handle arm extends away from the support assembly therefore allowing the handle arm to be grasped.

Also preferably, the connection assembly is sized, configurable or adaptable such that when the dolly is in the loading position, the support surface extends substantially at the same height as the trunk floor of the vehicle. For example, a segment of the connection assembly can be vertically-adjustable to position the support surface of the dolly in substantially the same plane of the trunk floor of the vehicle.

According to other possible embodiments, the dolly is designed and configured for facilitating loading of an object from the dolly onto a vehicle, and for transporting the dolly by the vehicle once the object has been loaded onto the vehicle. In this embodiment, the dolly still includes a support assembly with a support surface for supporting the object, the support surface comprising two ends and two lateral sides. The dolly is still provided with at least one wheel operatively connected near one of the ends of the support surface. The connection assembly can include a single assembly or distinct assemblies, and is operable to connect and disconnect the dolly to the vehicle hitch; but also to change a position of the dolly relative to the vehicle and the ground, when the dolly is connected to the vehicle hitch, from the ramp position to the loading position; and from the loading position to the transport position, in which the support surface is upright and extends along the rear of the vehicle, for transporting the dolly with the vehicle, once the object has been loaded in the vehicle.

According to another aspect, a method of operating a dolly for loading an object from the dolly onto a vehicle provided with a hitch is also provided. The method comprises the steps of loading an object on the support surface of a dolly, the dolly being provided with at least one wheel and a connection assembly for connecting and disconnecting the dolly to the vehicle hitch; rolling the dolly near the vehicle, and inclining the support surface until the connection assembly is aligned with the vehicle hitch; connecting the connection assembly to the vehicle hitch; pivoting the dolly to position the support surface parallel to the ground, in a loading position; unloading the object from the dolly and loading the object to the vehicle; and pivoting the dolly toward the vehicle in a transport position, by positioning the support surface vertically relative to the ground, for transporting the dolly with the vehicle once the object has been loaded onto the vehicle. Preferably, the method also include a step of storing the at least one wheel underneath the support surface of the dolly and/or collapsing barriers onto the support surface, rendering the doily more compact for transportation.

According to possible embodiments, the dolly can include a frame with lateral sides, a front end and a rear end; at least one wheel provided at the front end of the frame; a handle provided at the rear end of the frame; a support assembly connected to the frame, the support assembly comprising a support surface for supporting an object and an upstanding barrier for confining the object on the support surface; a catch secured to the frame, the catch comprising a projection defining an axis; a latch assembly comprising a first end and a second end, the first end being connectable to the trailer hitch and the second end being configured to removably latch with the catch and to allow rotational movement of the dolly about the axis of the projection, the latch assembly and the dolly being hingedly attached to one another allowing the dolly to be adjusted between a loading position in which the support surface is horizontal and a transport position in which the support surface is vertical; and a locking mechanism for locking the dolly in the loading position and in the transport position.

According to an aspect of the present invention, a dolly for attachment to a vehicle hitch is provided. The dolly includes a frame and at least one wheel connected to the frame. The dolly also includes a support assembly connected to the frame. The support assembly includes a support surface for supporting an object and an upstanding barrier for confining the object on the support surface. The dolly also includes a catch assembly secured to the frame, the catch comprises a projection defining an axis. The dolly also includes a latch assembly with a first end and a second end, the first end being connectable to the vehicle hitch and the second end being configured to removably latch with the catch assembly, to allow rotational movement of the dolly about the axis of the projection. The latch assembly may include a clamp with a locking mechanism configured to secure the catch within the latch assembly. It is also possible the provide a dolly where the wheel shaft assemblies are configured to receive a wheel assembly or a handle assembly, depending on the need of the users. The dolly can thus be configurable from a two-wheel to a four-wheel configuration.

In some embodiments, the latch assembly and the dolly are hingedly attachable to one another allowing the dolly to be adjusted between a loading position in which the support surface is horizontal and a transport position in which the support surface is vertical. Preferably, the dolly includes a locking mechanism for locking the dolly in the loading position and in the transport position.

In some embodiments, the dolly includes at least one wheel shaft assembly connected to the frame. The wheel shaft assembly includes a wheel shaft with a square section, the wheel shaft being slideable relative to the frame along a longitudinal axis and being pivotable about the longitudinal axis. A handle is provided at a first end of the wheel shaft, and a wheel bracket is provided at a second end of the wheel shaft, to connect one of the wheels to the frame. A square slot provided in the frame receives the square section of the wheel shaft and prevents pivoting of the wheel shaft about the longitudinal axis.

In some embodiments, a sliding bolt lock is operable to prevent the sliding of the wheel shaft along the longitudinal axis.

In some embodiments, the upstanding barrier includes side panels and end panels, the side panels being subdivided into top and bottom sections, the sections being hingedly secured to one another allowing the top section to fold onto the bottom section in a collapsed configuration.

In some embodiments, the latch assembly and the dolly are hingedly attached to one another allowing the dolly to be adjusted between a loading position in which the support surface is horizontal and a transport position in which the support surface is vertical; and a locking mechanism for locking the dolly in the loading position or in the transport position.

BRIEF DESCRIPTION OF THE DRAWINGS

Other objects, advantages and features will become more apparent upon reading the following non-restrictive description of exemplary embodiments thereof, given for the purpose of exemplification only, with reference to the accompanying drawings in which:

FIG. 6 is a bottom perspective view of the front end dory of FIG. 5, illustrating the central handle assembly in a deployed configuration;

FIG. 15 is a rear perspective view illustrating a catch assembly positioned over a latch assembly showing the dolly in a transport position, following the illustration in FIG. 14, in accordance with an embodiment.

FIG. 20 is a rear perspective view of the dolly of FIG. 18, showing the removal of barriers, embodied as side-panels, from the doily in the expanded configuration.

FIG. 20A is a detail view of the panel interlocking mechanism shown in FIG. 20.

FIG. 21 is a side view of the dolly of FIG. 18, showing the dolly in the expanded configuration.

FIG. 21A is a detail view of the biasing mechanism of the top-side panel shown in FIG. 21, FIG. 22 is a front view of the dolly of FIG. 18, showing the locking mechanism for the side panel in accordance with an embodiment.

FIG. 22A is a detail view of the locking mechanism of the side panel shown in FIG. 22.

FIG. 23 is a bottom plan view of the dolly of FIG. 18, showing the dolly in the collapsed configuration with the wheel shaft assembly in a folded configuration.

FIG. 23A is a detail view of the wheel shaft assembly longitudinal locking mechanism shown in FIG. 23.

FIG. 23B is a detail view of the wheel shaft assembly rotational locking mechanism shown in FIG. 23.

FIG. 24 is a rear perspective view of the dolly of FIG. 18, showing the collapsed configuration locking mechanism, in accordance with the second embodiment.

FIG. 24A is a detail view of the collapsed configuration locking mechanism shown in FIG. 24.

FIG. 25 is a side view of the dolly of FIG. 18, showing the dolly in the collapsed configuration and in a downward orientation.

FIG. 26 is a side view of the dolly of FIG. 18, showing the dolly in the collapsed configuration and in an upward orientation.

FIG. 26A is a detail view of the orientation locking mechanism shown in FIG. 26.

DETAILED DESCRIPTION OF THE PREFERRED EMBODIMENTS

In the following description, the same numerical references refer to similar elements. Furthermore, for the sake of simplicity and clarity, namely so as to not unduly burden the figures with several references numbers, not all figures contain references to all the components and features, and references to some components and features can be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Figure 1:
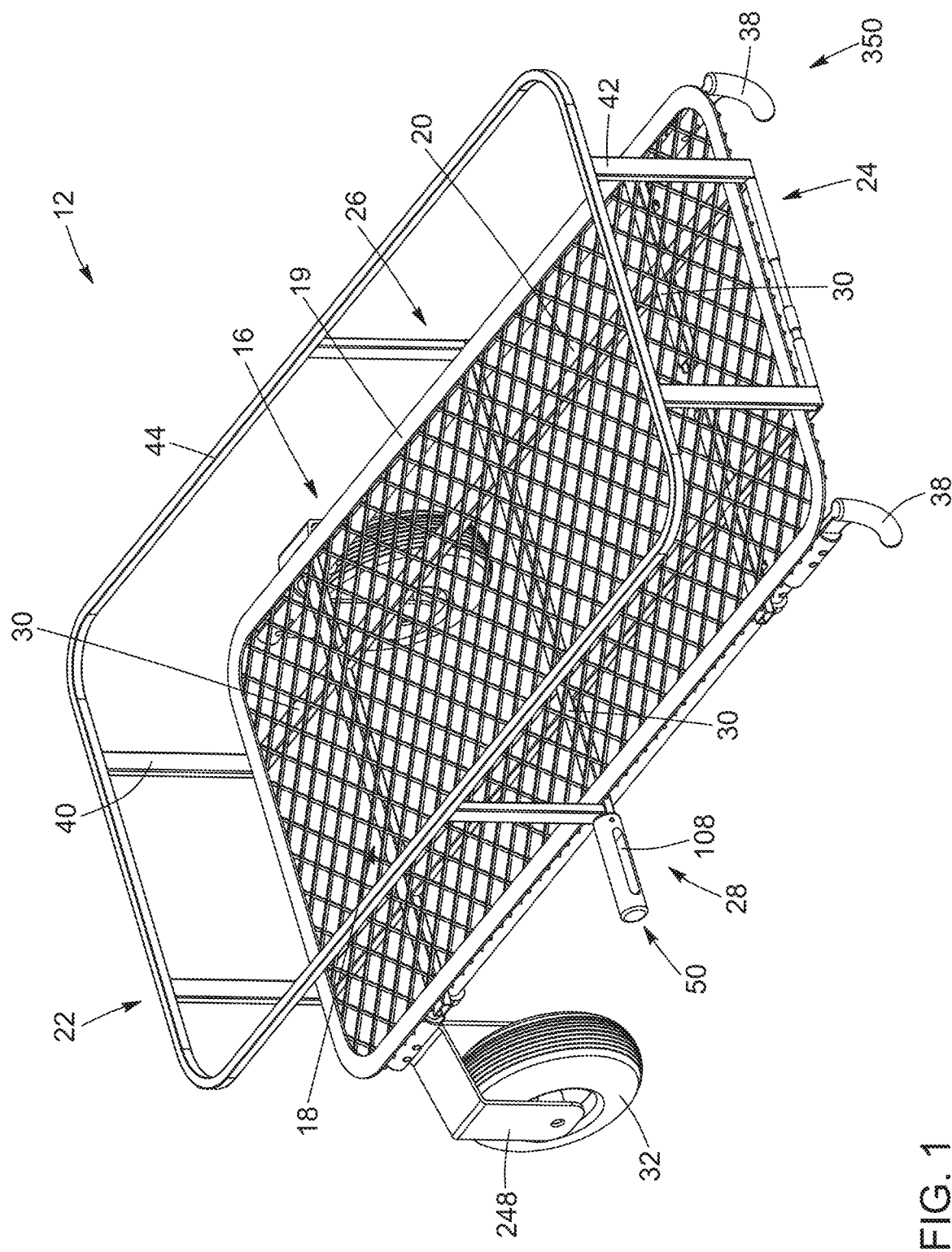
FIG. 1 is a front perspective view of a dolly, with a portion of the connection assembly removed, in accordance with a possible embodiment.

Referring to FIG. 1, there is illustratively provided a dolly generally referred to using the reference numeral 12. The dolly 12 can also be referred to as a cart. The dolly 12 can be carted by a user to transport an object, such as a box, a piece of furniture, machinery, or any other type of object. The dolly 12 is especially adapted to transport small loads, such as camping or sporting goods, plants, hardware store goods, such as wood or paint containers. For example, the dolly may be sized and configured to transport loads in the range of 200 lbs or 90 kg.

The dolly 12 illustratively includes a support assembly 18 for supporting the object during the transport thereof, in a manner as will now be described. In this embodiment, the dolly includes a frame 16, but in other embodiments, the frame may be omitted or be part of the support assembly 18. The support assembly includes a support surface 20, and has two ends, and two lateral sides. The ends may correspond to front and rear ends, 24, 22, where the front end may correspond to the end closer to the user when carted, and the rear end corresponding to the end provided with at least one wheel. The two lateral sides 26, 28 extend between the ends 22, 24, so as to define the generally planar support surface 20.

The frame 16 is illustratively formed from frame elements 19 such as metal tubing or the like and which can be welded or secured together using fasteners for example, to form a rigid planar structure which is illustratively rectangular in shape, however other shapes can be considered. Of note, the frame elements 19 may be formed from any other material such as plastic, or other types of metal such as steel or aluminum or the like. Alternatively, the frame 16 can be formed form a unitary tube construction including bends so as to form a support for a substantially planar structure.

The support assembly 18 illustratively includes a support surface 20, for supporting objects. Cross members 30 can be provided extending between the two lateral sides 26, 28 for example, or alternatively extending between the rear end 22 and the front end 24, or both. In one embodiment, the support surface 20 can be a grating, such as a metal mesh structure, connected between the frame elements 19. Alternatively, the support surface 20 can be a flat surface made from a metal or plastic sheet.

The dolly 12 further includes one or more spaced apart wheels 32, such as pneumatic tires or solid rubber wheels for example. The one or more wheels are operatively linked or connected to the support assembly 18, and preferably provided at or near an end of the support assembly 18. In the illustrated embodiment, the wheels are connected the support assembly via the frame 16, and an axial bearing or shaft on the rear end 22 and underside of the frame 16. In some embodiments, the dolly 12 includes only two wheels at its front end. In some other embodiments, the dolly 12 can include two pairs of wheels, one pair provided at or near the front end 24, and one pair provided at, or near, the rear end 22.

Figure 11B:
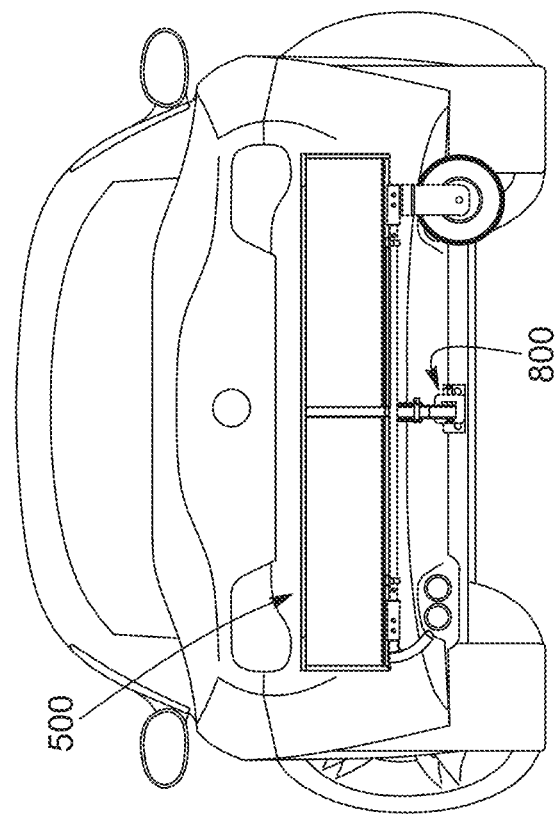
FIG. 11B is another side view of the dolly, illustrating the dolly in the loading position.
Figure 11A:
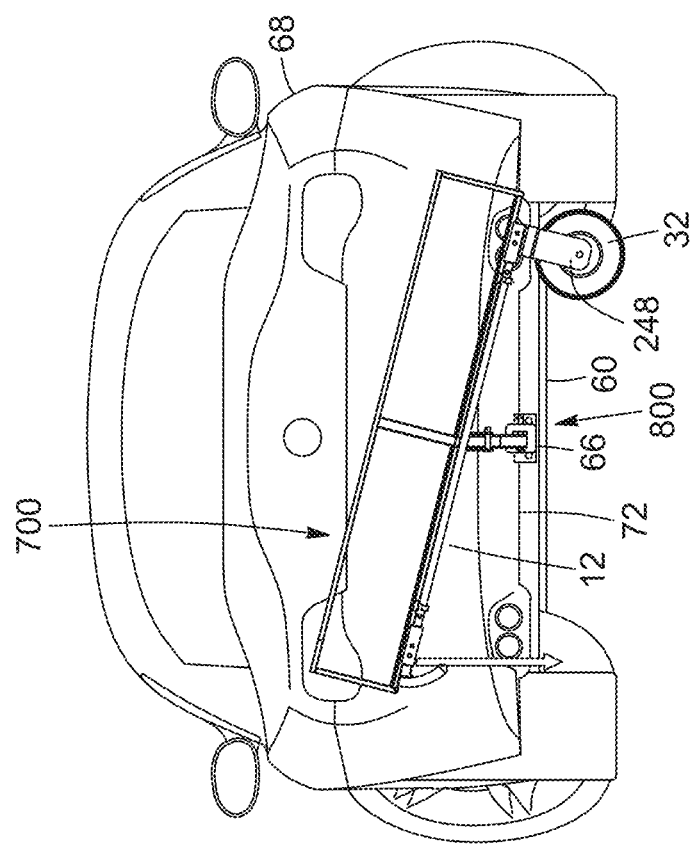
FIG. 11A is a side view of a dolly, in accordance with an embodiment, illustrating the dolly latched to the hitch of a vehicle, in a ramp or inclined position.

Referring to FIGS. 11A, 11B, 16 and 17, the dolly includes or is used with a connection assembly 800, which is operable to connect and disconnect the dolly to the vehicle hitch; and to change the position of the dolly relative to the vehicle and/or the ground, when the dolly is connected to the vehicle hitch. The dolly can be moved from a ramp position 700, such as shown in FIG. 11A, in which the support surface is inclined, to a loading position 500, as shown in FIG. 11B, in which the support surface 20 is raised and parallel to the ground, for loading the object from the dolly to the vehicle. The connection assembly 800 also allows the dolly 12 to be moved from the loading position 500, as shown in FIG. 11B, but also in FIG. 16, into the transport position 600, in which the support surface is upright and extends along the rear of the vehicle, for transporting the dolly with the vehicle, once the object has been loaded in the vehicle. In the transport position, the support surface preferably extends substantially vertically relative to the ground, for transporting the dolly. It will be noticed that in FIG. 11B, the wheels of the dolly 12 are deployed, in a rolling position, but that the FIG. 16, they have been repositioned in a stored position. The one ore more wheels of the dolly are thus preferably part of a wheel assembly, which is configurable between a rolling position and a stored position. In the rolling position, the wheel axis preferably extends parallel to the support surface, and in the stored position, the wheel axis preferably extends perpendicular to the support surface.

In the illustrated embodiment, the movement of the dolly from the ramp position to the loading position is a pivoting movement about a first axis, which extends along a length of the vehicle, as shown in FIGS. 11A and 11B. In other words, the cart can be pivoted about an axis that extends from the front to the rear end of the vehicle, the axis being also parallel to the hitch of the vehicle, which is typically a rectangular tube which extends from under the rear end of the vehicle. In this embodiment, this pivoting axis corresponds to the axis passing through the projection 52, which is identified on FIG. 2. As for the movement of the dolly that allows configuring it from the loading position to the transport position, this movement is preferably a rotational movement about a second axis which extends along a width of the vehicle, i.e. from the right to the left side of the vehicle. A locking mechanism allows locking the dolly in the loading position and in the transport position. In this specific embodiment, the locking mechanism includes a locking pin 104 and a cotter pin 77, identified in FIGS. 12 and 14, which can be moved on the hitch assembly (in this case corresponding the latch assembly 60), depending on the position of the dolly, as will be explained in more detail below.

Figure 9:
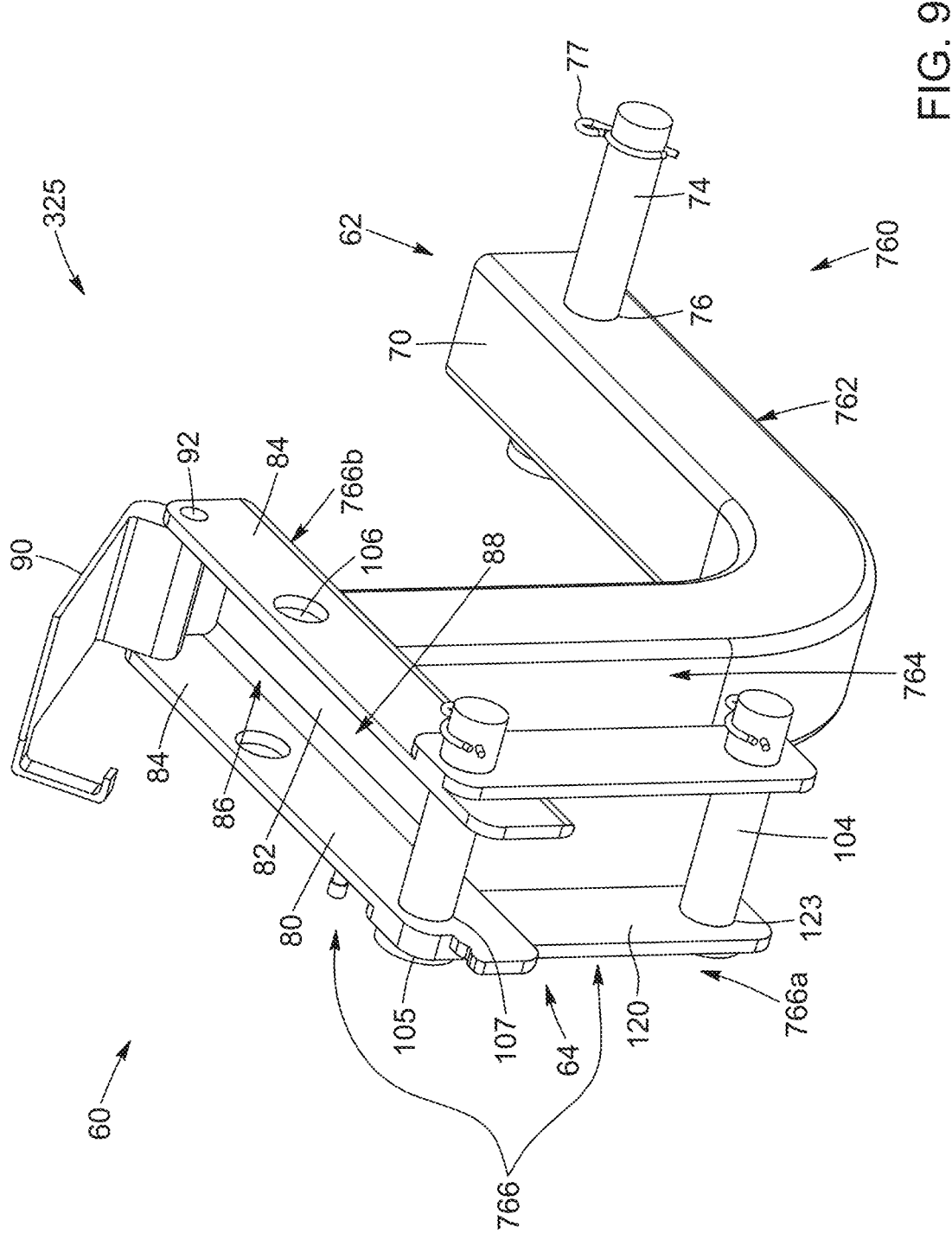
FIG. 9 is a rear perspective view of a portion of the connection assembly, corresponding to the hitch component, and more specifically to a latch assembly in an opened state, in accordance with an embodiment.

As illustrated in FIGS. 9 to 15, a possible embodiment of a connection assembly 800 is shown. The dolly component or portion 750 of the connection assembly 800 comprises a projection 52, extending from one of the lateral sides of the support assembly (best shown in FIG. 13). As for the hitch component or portion 760 of the connection assembly 800, it comprises a first end 62, connectable to the hitch; and a second end 64, connectable to the dolly component (best shown on FIG. 9). In this particular embodiment, the hitch component 760 includes three sections: one section that is a lower section 762, connectable to the hitch, one middle section 764, which is upright, and one section 766 which is an upper section, substantially parallel to the lower section. This upper section 766, is preferably configured to receive the dolly component 750, in either the loading or the transport position. More specifically, the second end of the hitch component 64 preferably includes two segments 766a, 766b, at angle from one another, and preferably at right angle. The first segment 766b extends parallel to the ground, and is sized and configured to receive, secure or attach the dolly component when in the loading position, and the second segment 766a, which extends perpendicular to the ground, is sized and configured to connect, receive or secure the dolly component in transport position. In this case, the projection 52 includes a projection groove 108 (best shown in FIG. 12), and the first segment comprises a U-shaped housing 80, to receive the projection in the loading position, and the second segment comprises guides 120, which, in combination with pins 105, 104 allows securing the projection 52 in the loading position. The rotation pin 105 is insertable through the projection groove 108 to guide rotation of the projection 52 when moving the dolly 12 between the loading and the transport position, and the locking pin 104 can be inserted in the projection groove 108 to secure the projection to the first segment or the second segment, depending on whether the dolly is in the loading position or in the transport position. As best shown in FIG. 9, the illustrated embodiment of the hitch assembly 760 includes two L-shaped portions: a first L-shaped portion, including the first end 62, connectable to the vehicle's hitch, and a second L-shaped portion, including the first and second segments 766a, 766b, connectable to the dolly component 750, and used to reposition the dolly between the loading and transport positions. An anti-tilting system can be provided to restrict rotation of the dolly in the loading or transport position. In this example, the locking and/or pivoting pins can be used to prevent rotation of the dolly about the projection axis.

Optionally, the hitch or dolly component of the connection assembly can be configurable between an extended configuration and retracted configuration, for positioning the dolly closer or farther away from the vehicle, when the dolly is connected to the hitch. For example, one of the hitch component and dolly component can include a telescoping member 767, such as shown in FIG. 15, configurable between an extended and retracted configuration, for spacing the dolly closer or farther away from the vehicle, when the dolly is connected to the hitch. In the illustrated embodiment, the second end, the preferably the lower section of the hitch assembly 760 is telescopic, and thus the distance between the dolly and the vehicle can be adjusted, allowing for example to open the trunk even when the dolly is connected to the hitch.

A more detailed description of a particular embodiment of the connection assembly will be provided in more detail in another section of the description. Of course, the connection assembly can take various configurations, and other shapes are possible, with more or less segments/subassemblies.

Figure 2:
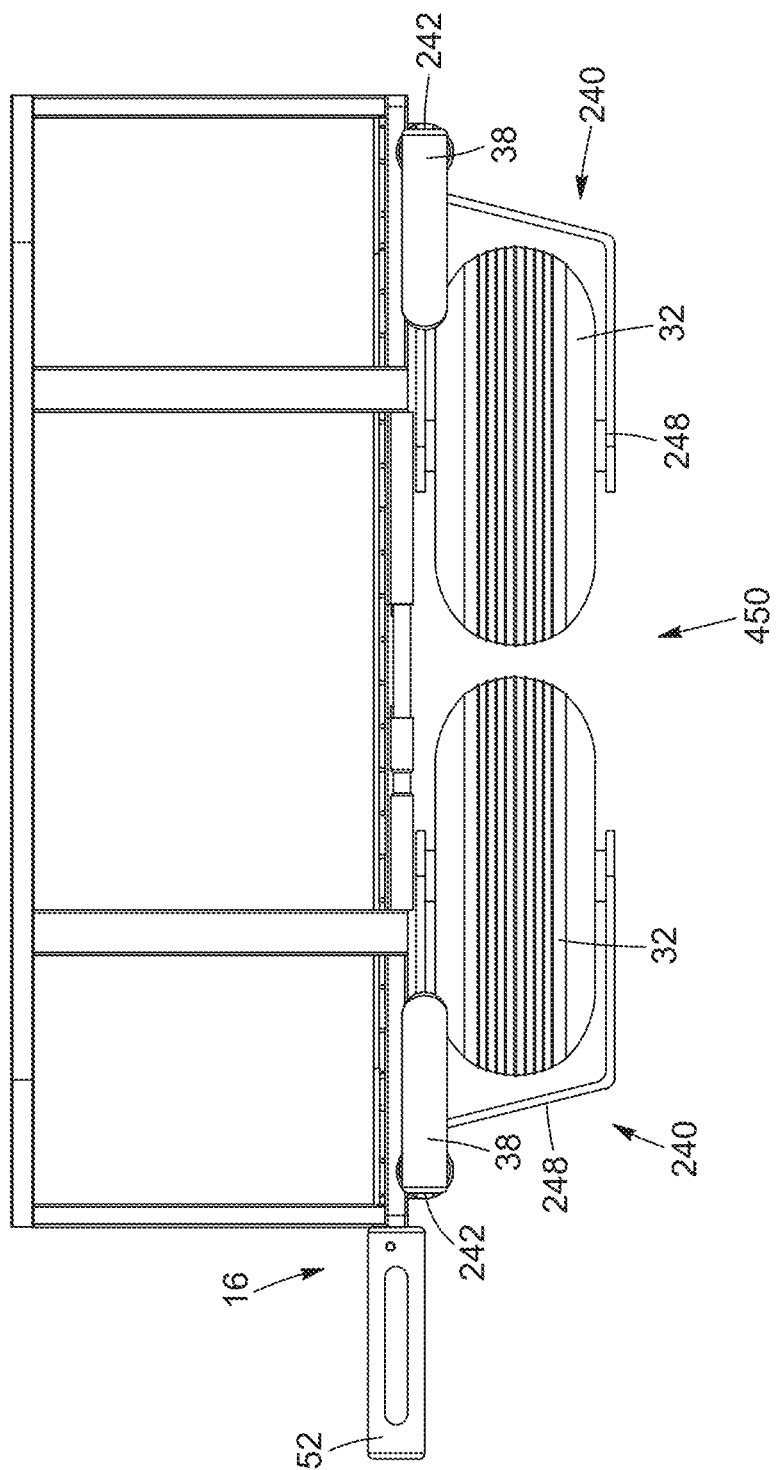
FIG. 2 is a side view of the dolly of FIG. 1, with the wheel shaft assembly in a folded configuration.
Figure 2A:
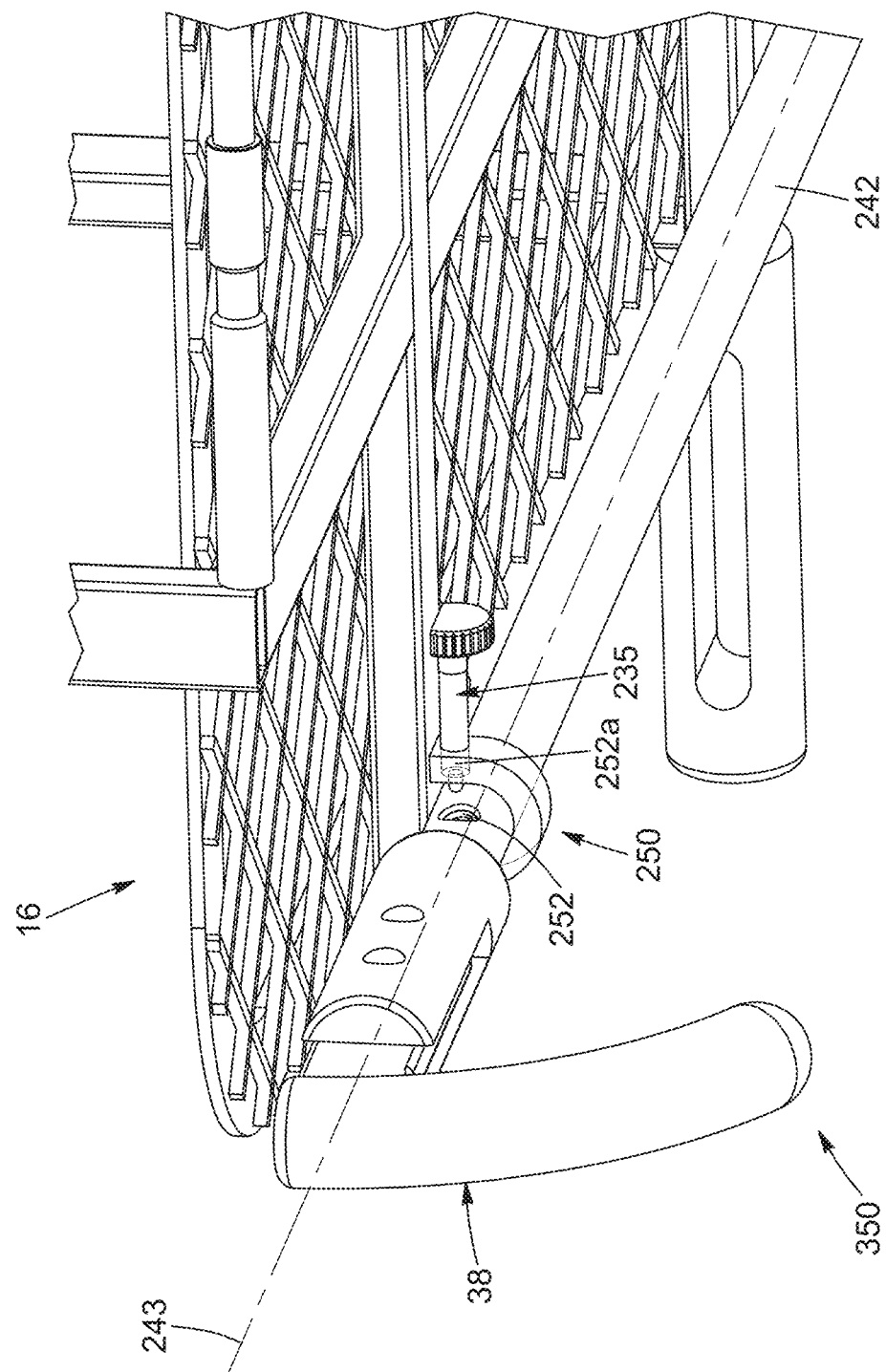
FIG. 2A is detail view of the mechanism allowing the rotation of the wheel shaft assembly to reach the folded configuration of FIG. 2.
Figure 3:
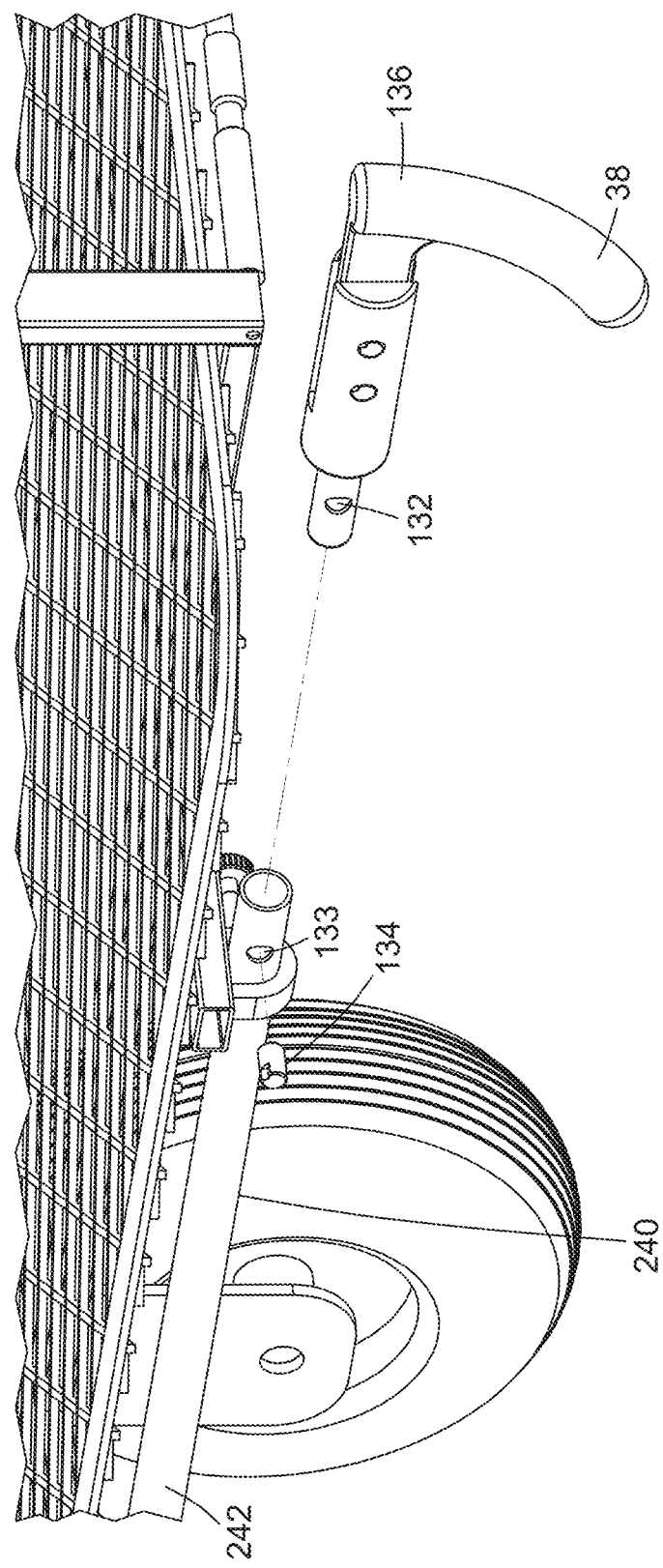
FIG. 3 is a detail view of an attachment assembly where the attachment is a handle, in accordance with an embodiment.

Referring to FIGS. 2A and 3, the dolly 12 can include handles 38 to provide the user with a means of grasping and maneuvering the dolly 12. Illustratively, the handles 38 may be adapted to extend outwardly from the frame 16, for example as an extension of frame elements 19, forming the lateral sides 26, 28. Other configurations and types of handles may also be provided. The handles 38 may be used by the user to grasp and lift the dolly 12 when it is in a resting position, for example when the dolly 12 is resting on the ground such that the support surface 20 is parallel or almost parallel to the ground. Using the handles 38 in this way, the user may bring the dolly 12 up to a tilted position such that any bad supported by the dolly 12 due to an object 14 being supported thereby, can be easily carted by pushing or pulling the dolly 12 to engage the rotation of the wheels 32 in a manner as is commonly known in the art.

Now referring to FIGS. 2 and 2A, in addition to FIG. 1, in the present embodiment, the wheels 32 and handles 38 are attached to the dolly 12 via first and second wheel shaft assemblies 240. In the present embodiment, the wheel shaft assemblies 240 are spaced apart from one another and are positioned below the support surface 20. The wheel shaft assemblies 240 extend substantially laterally, respectively along the two lateral sides 26, 28 of the frame 16. In the present embodiment, each wheel shaft assembly 240 comprises a wheel shaft 242 provided with one wheel 32 and one handle 38 positioned at opposite ends of the wheel shaft 242. The wheel 32 is illustratively attached to the wheel shaft 242 at the rear end 22 of the doily 12 via a wheel bracket 248. The wheel bracket 248 can be secured to the wheel shaft 242 through welding but can alternatively be secured thereto using other, less permanent, means. Each handle 38 is attached to the wheel shaft 242 at the front end 24 of the dolly 12 and can be secured thereto using fasteners like screws or bolts.

In the present embodiment, each wheel shaft 242 can have a substantially cylindrical shape and define a shaft axis 243 which is illustratively parallel to the two lateral sides 26, 28. The wheel shaft assemblies 240 are slideably mounted to the frame 16 and can thus slide along a direction of the shaft axis 243 while simultaneously rotate about the shaft axis 243 of their respective wheel shafts 242. The wheel shaft assemblies 240 can be operated in different configurations depending on the situation. In FIG. 1, the wheel shaft assemblies 240 have a deployed configuration 350, where the wheels 32 and handles 38 are substantially perpendicular to the support surface 20. In this configuration, the wheels 32 can effectively roll on the ground for an efficient use of the dolly 12. Moreover, as shown in FIG. 2, the wheel shaft assemblies 240 can also be configured or placed in a stored configuration 450, where the wheels 32 and handles 38 are substantially parallel to the support surface 20, rendering the dolly 12 more compact and therefore better suited for transportation.

Referring now to FIG. 2A, in the present embodiment, each wheel shaft assembly 240 comprises a locking mechanism 250 configured to block the rotation of the wheel shaft assembly 240 therefore retaining the wheel shaft assembly 240 in a predetermined configuration. In this embodiment, the locking mechanism 250 comprises at least two locking apertures 252 arranged around a periphery of the wheel shaft 242, a frame aperture 252a extending through the frame 16 and adapted to align with one of the locking apertures 252 and at least one locking plunger 253 configured to engage the aligned apertures 252, 252a of the locking mechanism 250, effectively blocking the rotation of the wheel shaft assembly 240. In order to enable the rotation of the wheel shaft assembly 240, the locking plunger 253 must be slid out/disengaged from both the locking aperture 252 and the frame aperture 252a thus allowing the wheel shaft assembly 240 to rotate about the lateral shaft axis 243. For example, from the deployed configuration 350, each wheel shaft assembly 240 can be rotated into the stored configuration 450, effectively aligning the frame aperture 252a with a second locking aperture (not shown). Once in the stored configuration 450, the locking plunger 253 is then inserted back into the frame aperture 252a, and thus the second locking aperture, to lock the rotational movement of the wheel shaft assembly 240. In a possible embodiment, the plunger 253 is provided with a plunger spring (not shown) configured to pull the plunger back into the locking aperture 252 once released, while simultaneously preventing the plunger 253 from being completely removed from the wheel shaft 242, reducing the risks of dropping or losing the plunger 253 when handling it.

Figure 4:
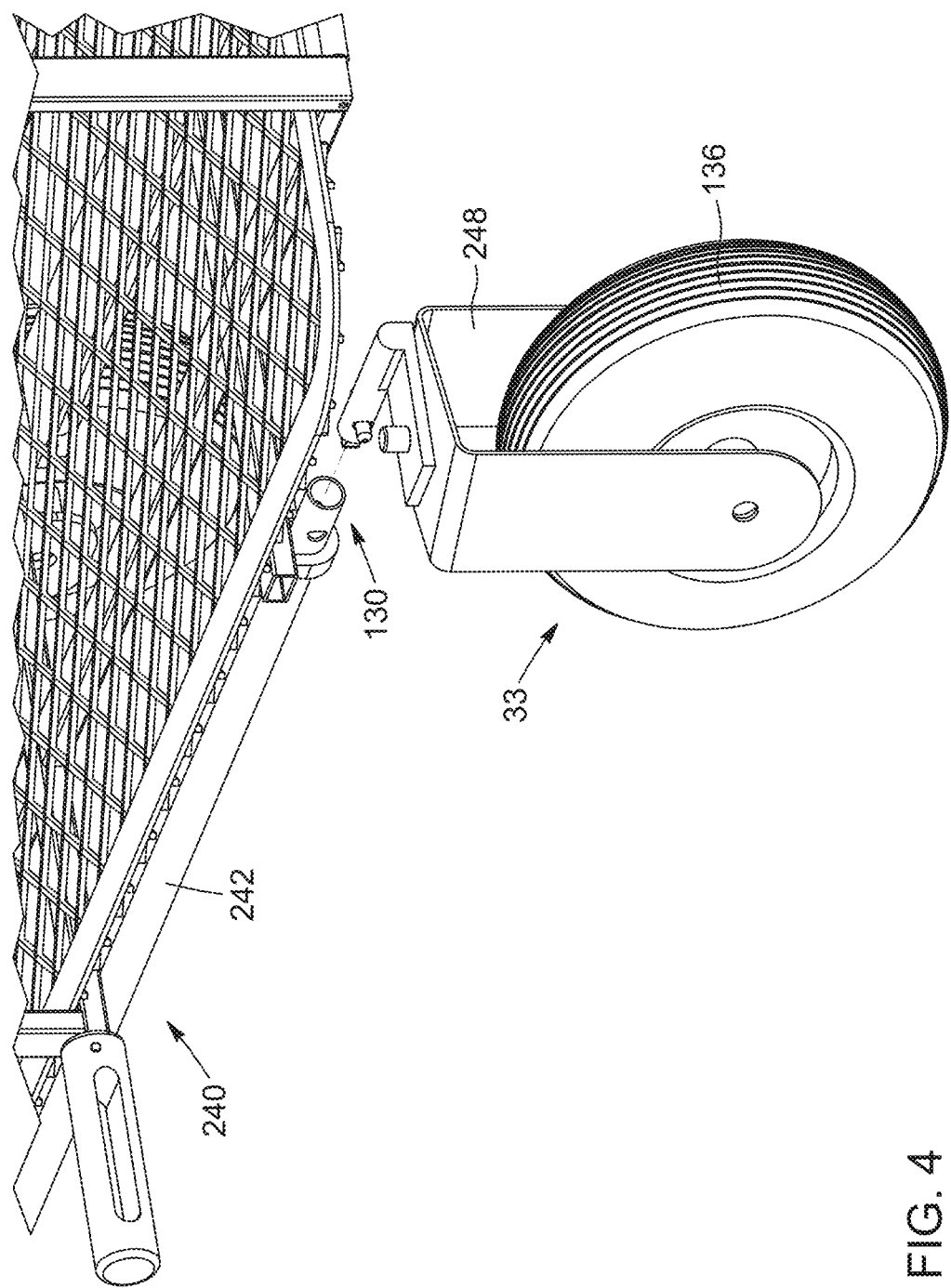
FIG. 4 is another detail view of the attachment assembly, where the attachment is a wheel assembly, in accordance with another embodiment.

Now referring to FIGS. 3 and 4, in the illustrated embodiment, the handles 38 are removably secured to the wheel shaft assemblies 240 in order to allow other components to be inserted in place of the handles 38 to configure the dolly 12 for performing different functions. Each wheel shaft is sized and configured to receive at one of its end a handle or a second wheel. For example, the handles 38 can be replaced by an additional pair of wheels 32, allowing the dolly 12 to roll around on four wheels instead of two. In this embodiment, the wheel shaft 242 of the wheel shaft assembly 240 illustratively includes an attachment mechanism 130 configured to removably attach accessories 136 to the wheel shaft 242. The accessories 136 can be a wheel assembly 33, comprising a wheel 32 and a wheel bracket 248, or a handle 38, for example. The attachment mechanism 130 illustratively comprises attachment apertures 132 extending through the accessory 136 and a shaft aperture 133. The attachment aperture 132 and the shaft aperture 133 are configured to align when the accessory 136 is positioned on the wheel shaft 242. The attachment mechanism 130 is further provided with an attachment fastener 134 sized and shaped to engage in the aligned attachment and shaft apertures 132, 133 to effectively lock the accessory 136 in place on the wheel shaft 242. For example, the attachment fastener 134 can be a screw or bolt or any other suitable fastening means. To change the configuration of the dolly 12 from a two-wheeled cart to a four-wheeled cart, the attachment fastener 134 must first be disengaged from the corresponding apertures. The handle 38 can then be removed from the wheel shaft 242 and the wheel assembly 33 can be positioned onto the wheel shaft 242. Finally, the attachment fastener 134 can be reengaged in the attachment and shaft apertures 132, 133 to lock the wheel assembly 33 in place.

Figure 5:
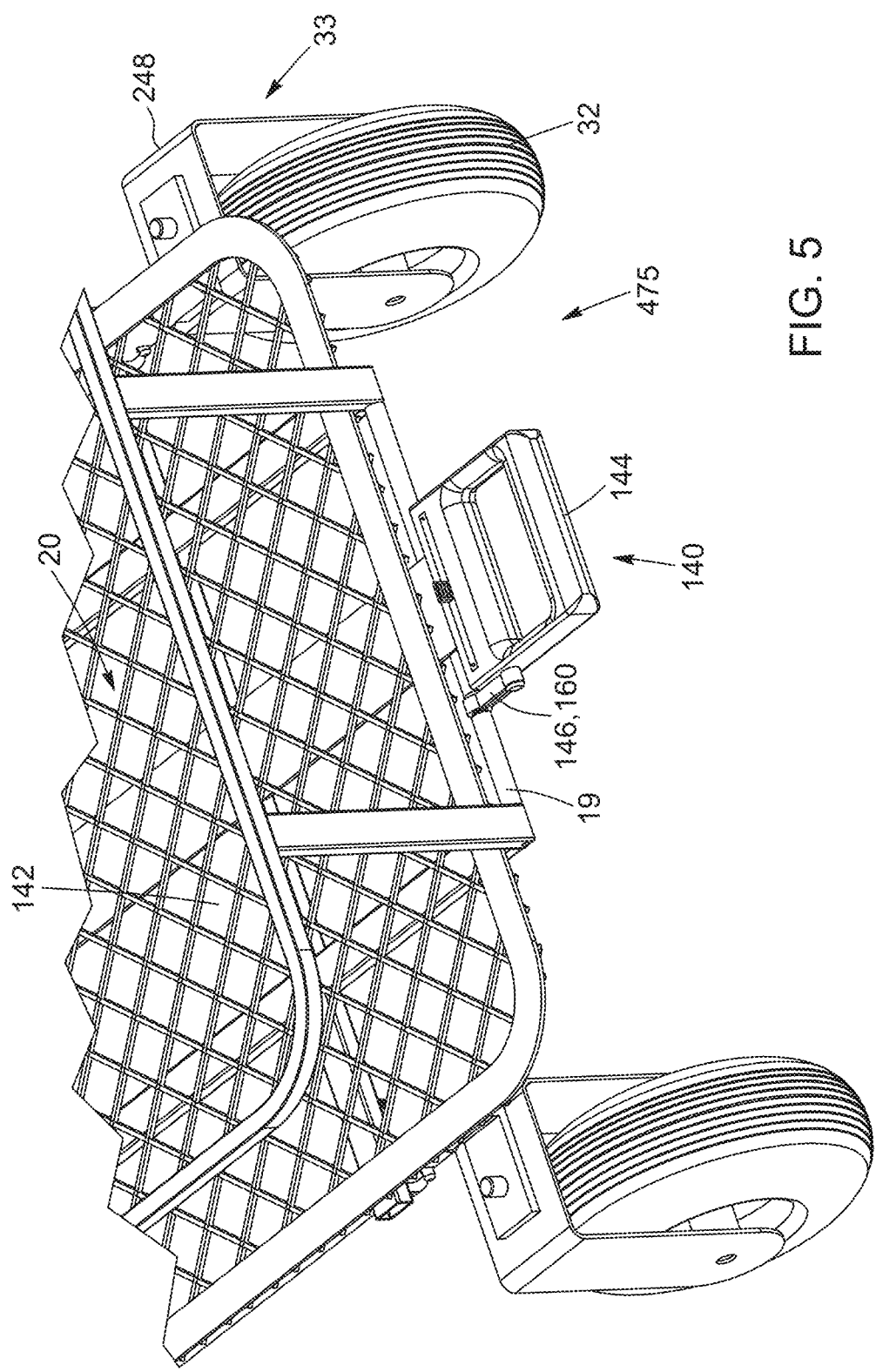
FIG. 5 is a top perspective view of the front end of the dolly, in accordance with an embodiment, illustrating a central handle assembly in a stored configuration.

Now referring to FIGS. 5 and 6, the dolly 12 further includes a handle assembly 140 configured to allow the dolly 12 to be pulled, preferably when it comprises four wheels 32. In this embodiment, the handle assembly 140 is attached to the frame 16 below the support surface 20 and includes a handle arm 142 rotatably mounted to the frame 16, a central handle 144 extending from the handle arm 142 and a handle-locking mechanism 146 configured to retain the handle assembly 140 in a predetermined configuration. The central handle assembly 140 can be operated into a stored position 475 (as illustrated in FIG. 5) where the handle arm 142 is positioned under the support surface 20 substantially parallel thereto or in a deployed position 375 where the handle arm 142 extends away from the frame therefore allowing the central handle 144 to be grasped so that a user may pull the dolly 12.

According to one possible embodiment, the handle arm 142 is made of metal, alternatively, the handle arm 142 can be made from other materials like plastic for example. The handle arm 142 is provided with a lateral opening 148 along a longitudinal direction of the handle arm 142, the opening being configured to hook a frame element 19 of the frame 16 therefore allowing the handle arm 142 to slide along the longitudinal direction to operate the handle assembly 140 and change its configuration as mentioned above. The handle arm 142 is further provided with an arm plunger aperture 150 and an arm plunger 152 designed to lock the handle assembly 140 in the deployed position 375 (as illustrated in FIG. 6). The central handle 144 is removably attached to the top end of the handle arm 142 and is designed to allow the dolly 12 to be easily pulled and rolled when the central handle assembly 140 is deployed and especially when the dolly is provided with four wheels 32. In the illustrated embodiment, the handle-locking mechanism 146 includes a snap-clip 160 extending from the central handle 144 towards to handle arm 142 and is configured to snap onto the frame element 19 of the frame 16 to lock the central handle assembly 140 in the stored position. The snap-clip 160 is preferably made of plastic but can alternatively be made of any suitable material.

Figure 7A:
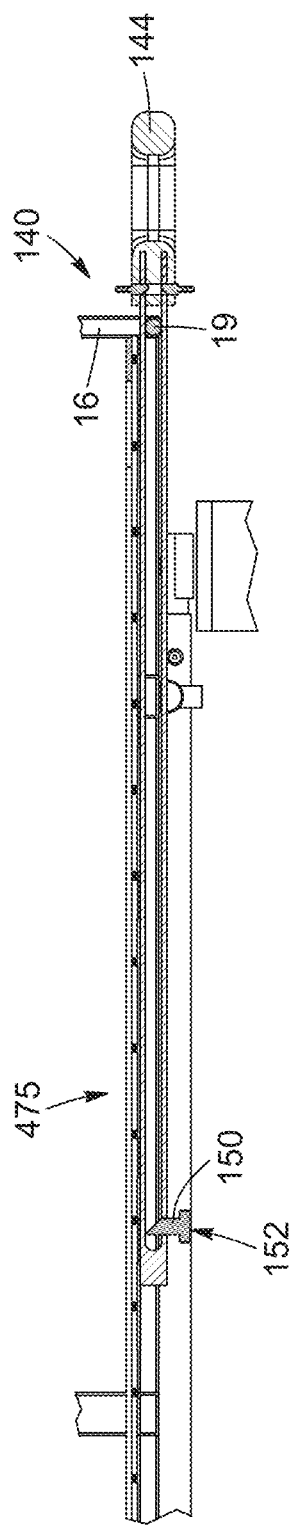
FIGS. 7A and 7B are a side views of the central handle assembly, illustrating the stored and deployed configurations of the handle.
Figure 7B:
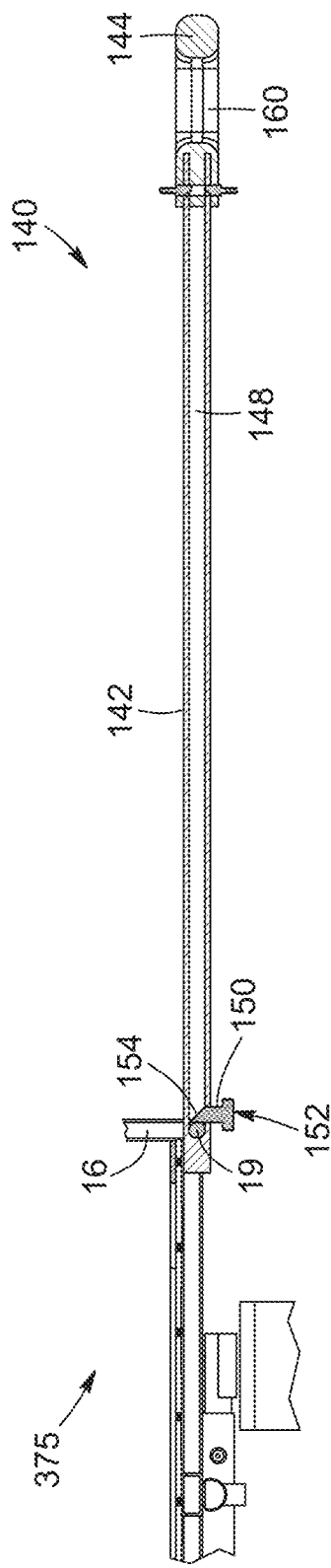

Now referring to FIGS. 7A and 7B, a method for deploying the central handle assembly 140 is provided. From the stored position 475, the snap-clip 160 must first be disengaged from the frame 16 by pulling the central handle 144 outwardly. The handle 144 is pulled until the handle arm 142 bottoms-out with the frame element 19 on which it is mounted, as illustrated in FIG. 7B, therefore achieving the deployed position 375 of the handle assembly 140. The arm plunger 152 is preferably designed to disengage the arm plunger aperture 150 automatically when the handle assembly 140 is being deployed. This can be achieved by providing a slanted surface 154 to the arm plunger 152 configured to be pushed down by the frame element 19 it encounters when the handle assembly 140 is deploying. The arm plunger 152 can be provided with a spring mechanism (not shown) designed to re-engage the arm plunger 152 with the arm plunger aperture 150 when the arm plunger is released.

In order to store the handle assembly 140 from the deployed position 375, the arm plunger 152 must be pulled downwardly to disengage the arm plunger aperture 150 thus allowing the handle assembly 140 to be pushed back under the support surface 20. Finally, the snap-clip 160 must be reengaged with the frame 16 by snapping it onto the frame element 19 it was originally attached to, thus securing the handle assembly 140 in the stored position 475.

Referring back to FIG. 1 again, extending from the frame 16, there is illustratively provided an upstanding barrier 40 which extends away and perpendicularly from the support surface 20, or perpendicularly from the frame elements 19. Illustratively the upstanding barrier 40 extends from the rear end 22 and the lateral sides 26, 28 to prevent objects positioned on the support surface 20 from falling off the dolly 12 in any direction. The upstanding barrier 40 illustratively includes posts 42 extending from the frame elements 19, and a rail 44 connected to the posts 42 and running parallel alongside the rear end 22, the two lateral sides 26, 28 and the front end 24 of the frame 16. In an alternate embodiment, the rail 44 is optionally not provided to run along the front end 24 of the frame 16 so that the support surface 20 may act as a ramp when in contact with the ground.

As previously mentioned, the upstanding barrier 40 functions to provide a restrictive boundary for any object placed on the support surface 20, so as to secure and maintain the object within the confines of the support surface 20 during displacement of the dolly 12. Optionally, the rail 44 may be provided with hook attachments connected to a strap accessory such as a rope, a strap or bungee cord for example (none shown) which can be used for securing one or more objects to the dolly 12. In this regard, the dolly 12 can be adapted to strap down and hold one or more objects upon the support surface 20. The upstanding barrier 40 may thus function to maintain the object over the support surface 20 when the dolly 12 is illustratively tilted forward or side to side, or to contain the inertial movement of the object on the dolly, for example over the support surface 20, when the object is subjected to an acceleration or a deceleration force. Optionally, the dolly 12 can be further adapted to include a foot portion (not shown) extending perpendicularly away from the rear end 22 of the frame 16 for sliding between the object and the ground and acting as a lever for tilting and carrying an object thereon when the dolly 12 is pivoted about the wheels 32 as is commonly known in the art.

Figure 8:
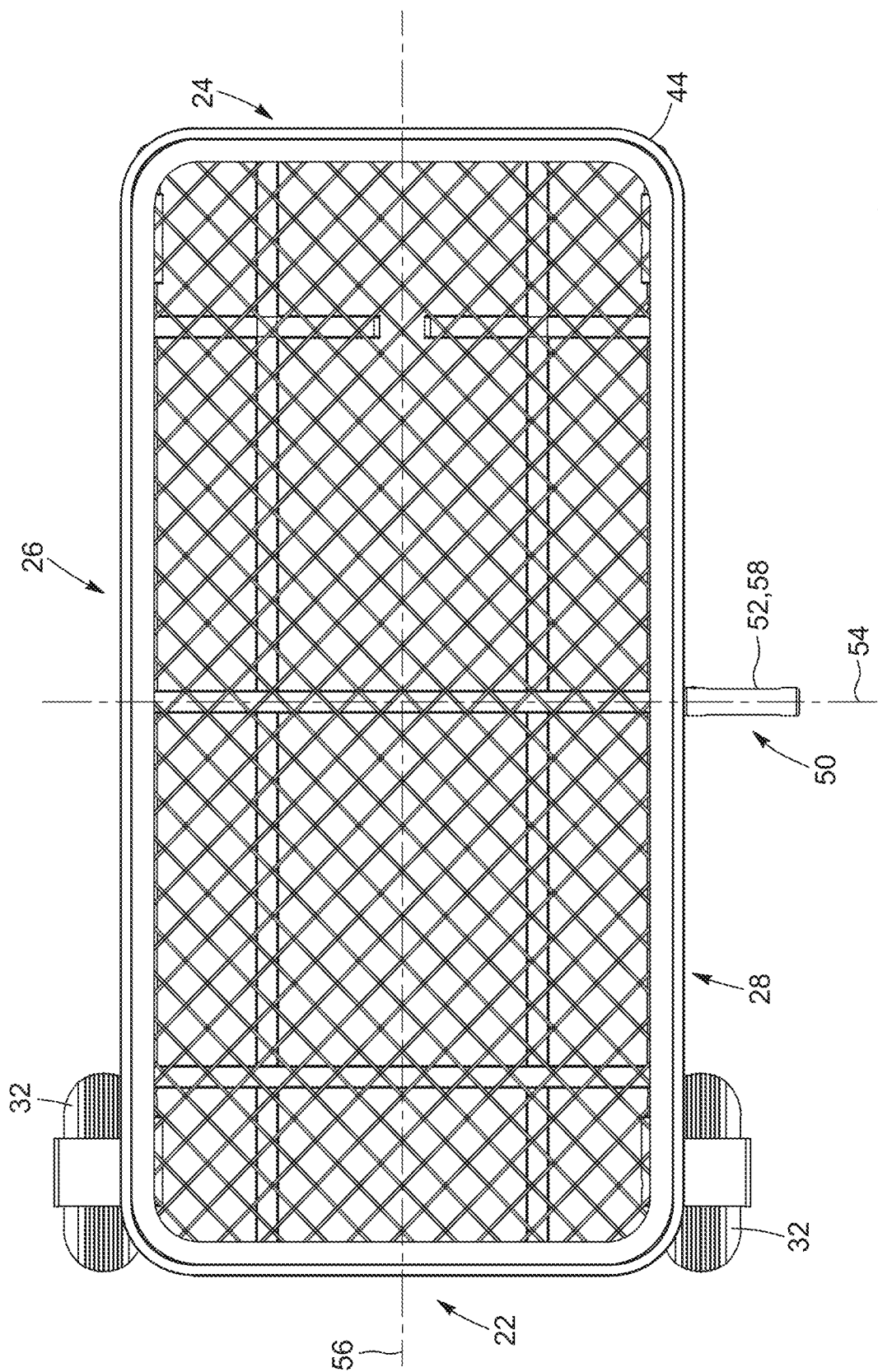
FIG. 8 is a top plan view of the dolly of FIG. 1.

Now referring to FIG. 8, in addition to FIG. 1, the dolly 12 includes the dolly assembly, embodied in this case as a catch assembly 50 secured to the frame 16. The catch assembly 50 illustratively includes a projection 52 projecting perpendicularly from one of the lateral sides 26, 28 in a manner parallel to the plane of the support surface 20. The projection 52 includes an axis 54 which is illustratively perpendicular to the longitudinal axis 56 of the dolly 12. Illustratively, the projection 52 may be a rod 58 connected, for instance by welding, to the frame members 19, and extending between the lateral sides 26, 28 of the frame 16 perpendicular to the longitudinal axis 56 to thus project from the side of the dolly 12. Optionally, and as illustrated, the rod 58 may be connected to both lateral sides 26, 28 frame elements 19, so as to extend between the frame 16 and be secured thereto, but other attachment configurations are possible, for example the rod 58 may be sufficiently supported and extend from only one of the lateral sides 26, 28. Optionally, the rod 58 may include a radially projecting flange (not shown) extending from the end of the rod 58.

Figure 10:
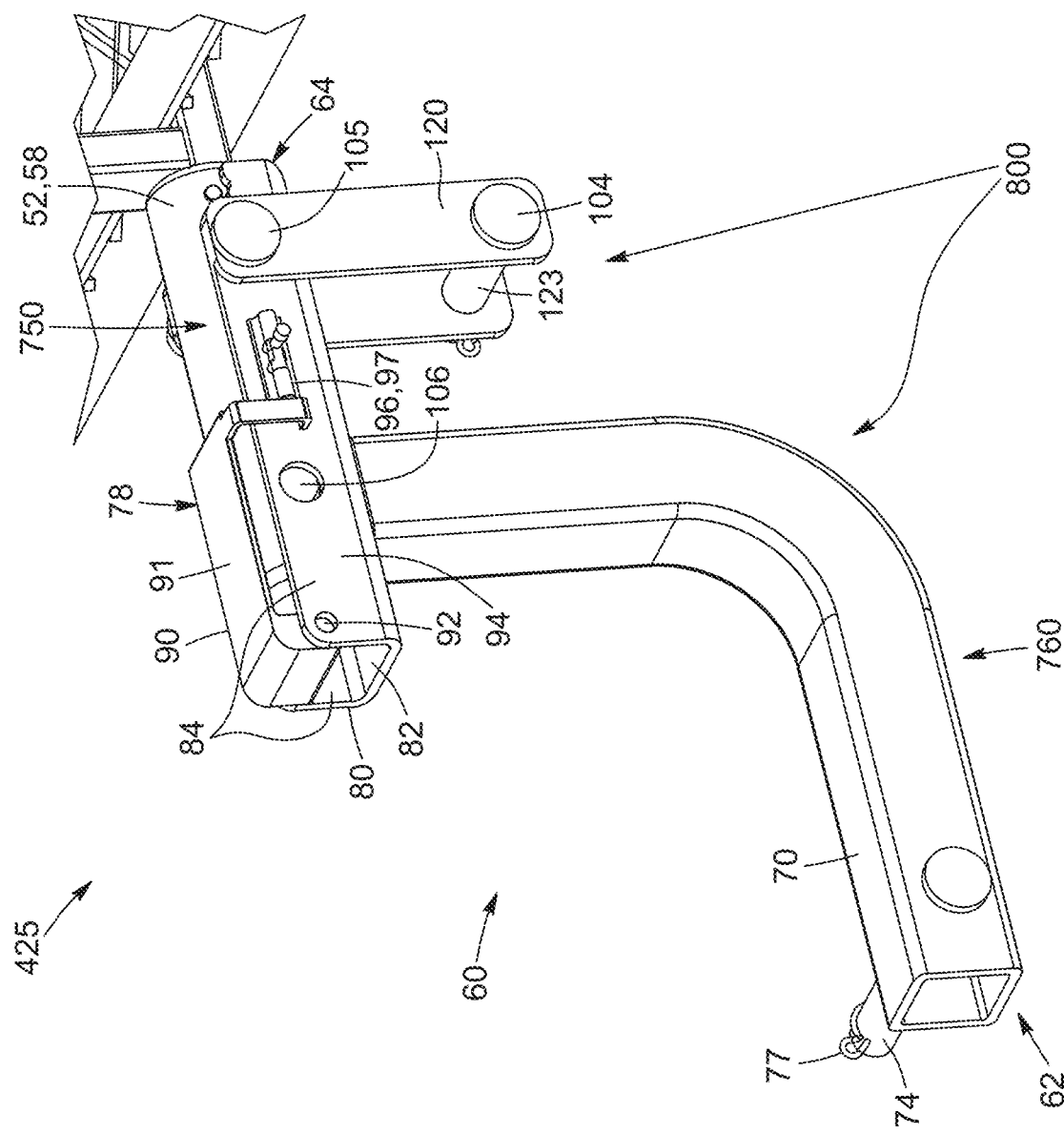
FIG. 10 is a rear perspective view of the latch assembly of FIG. 9 in a closed state, in accordance with an embodiment.

Now referring to FIGS. 9 to 11, the dolly 12 also includes the hitch assembly, in this case embodied as the latch assembly 60, including a first end 62 and a second end 64. The first end 62 is connectable to a trailer hitch 66 of a vehicle 68 and the second end 64 is configured to removably latch onto the catch assembly 50. The expression "removably latch" is used herein to refer to the ability of the second end 64 to be connected with the catch assembly 50, and also disconnected from the catch assembly 50. For example, the first end 62 may comprise a square male portion 70, formed from a square of metal tubing, which is configured to be slideably received within a corresponding square hollow female portion of the trailer hitch 66 provided on the rear underside 72 of the vehicle 68, as is commonly known in the art, and secured thereto when the square male portion 70 is slideably received within the corresponding square hollow female portion of the trailer hitch 66 and secured thereto using a pin 74 slid through aligned apertures 76 provided on the square male portion 70 female portion (not shown) of the trailer hitch 66 and maintained therein using a cotter pin 77 engaged to the pin 74 in a manner as is generally known in the art.

Now referring more specifically to FIGS. 9 and 10, in addition to FIG. 1, the latch assembly 60 further includes a clamp 78 with a U-shaped housing 80. The U-shaped housing 80 includes a base portion 82 connected to the second end of the latch assembly 64 and two upstanding side portions 84 to define an open top 86 opposite the base portion 82 and a space 88 enclosed by the base portion 82 and the two upstanding side portions 84. Illustratively, the U-shaped housing 80 may be formed from a single sheet of bent metal, but a unit of welded metal components may also be provided. The U-shaped housing 80 also includes a pivotable flap 90 provided with a top surface 91. For example, the pivotable flap 90 can be an L-shaped plate configured to enclose the space 88. The pivotable flap 90 is rotatably mounted, for example by a hinge 92, to a top end 94 of one of the upstanding side portions 84 of the U-shaped housing 80. The pivotable flap 90 is moveable between an open configuration 325 such that the space 88 is accessible through the open top 86 and the U-shaped housing 80 is able to engage the catch assembly 50, and in particular the U-shaped housing 80 able to receive the projection 52 therein, to a closed configuration 425 where the space 88 is inaccessible through the open top 86 and the U-shaped housing 80 is unable to engage the catch assembly 50, and in particular the U-shaped housing 80 is unable to receive the projection 52 therein.

The latch assembly 60 further includes a flap locking mechanism 96 illustratively including a flap sliding bolt 97 attached to the U-shaped housing 80 so as to engage and lock the pivotable flap 90 in the closed state as shown in FIG. 10. Alternatively, the flap locking mechanism 96 can include a lever clamp and a movable ring which engages a hook projecting from a flange extending downwardly from one of the side portions 84 for securing the pivotable flap 90 in the closed state. Other locking mechanisms may also be provided, which would render the space 88 (identified in FIG. 9) inaccessible to the projection 52 through the open top 86 (identified in FIG. 9) of the U-shaped housing 80 and to render the projection 52 when received within the space 88, unable to escape from the U-shaped housing 80.

In this embodiment, the latch assembly 60 further includes at least one locking pin 104 configured to slide through corresponding housing apertures 106 illustratively provided in the side portions 84 of the U-shaped housing 80, and also slide through a projection groove 108 provided along the projection 52 to prevent rotation and movement of the projection 52 about the axis 54 (identified in FIG. 8) when the latch assembly 60 is removably latched with the projection 52. The latch assembly 60 also includes a rotation pin 105 configured to slide through corresponding rear housing apertures 107 provided in the side portions 84 of the U-shaped housing near the second end 64 of the latch assembly 60, and through the projection groove 108 in order to retain the dolly 12 latched to the latch assembly 60 if the locking pin 104 is removed.

Figure 12:
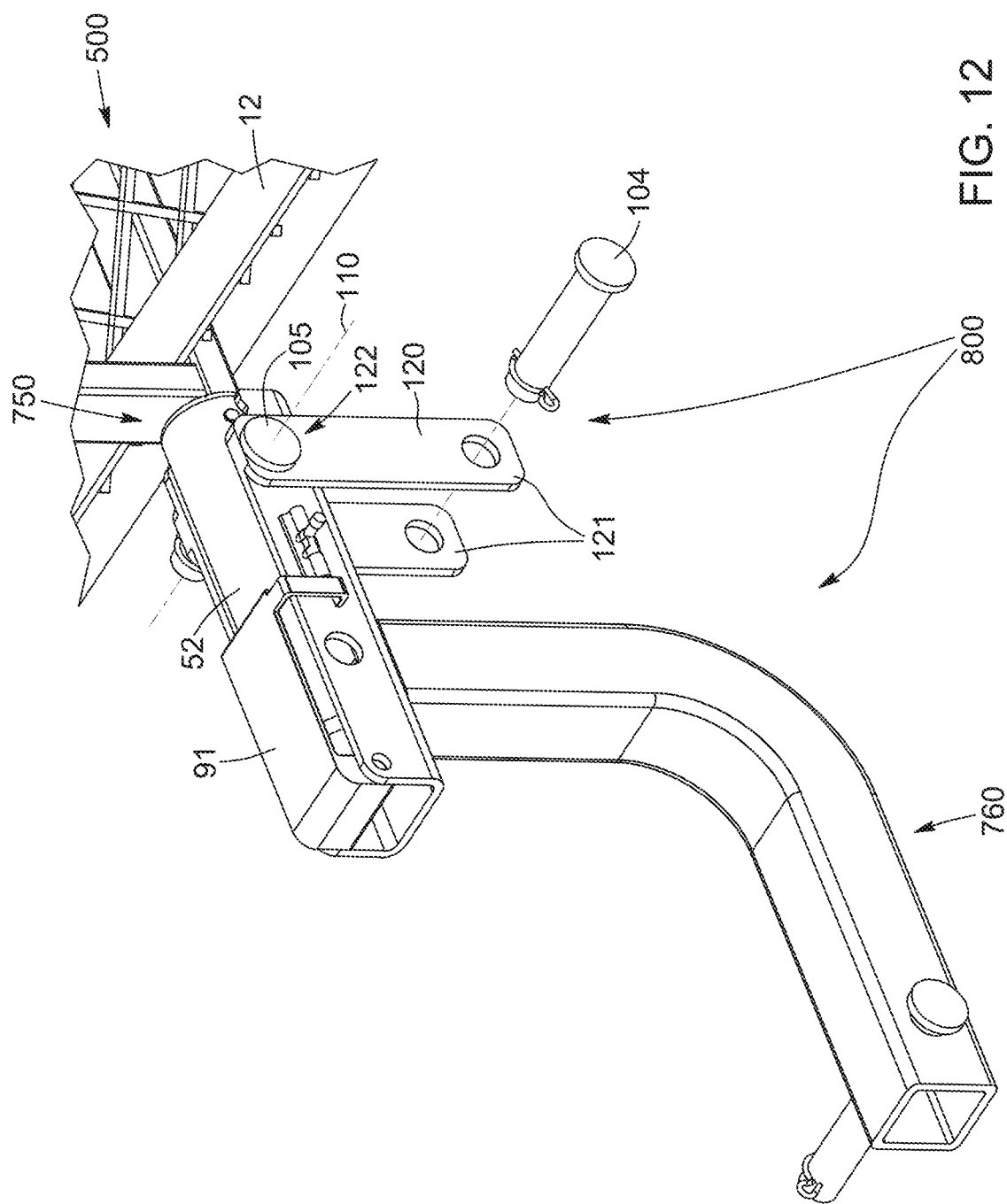
FIG. 12 is a detail view of the dolly, illustrating a possible embodiment of a connection assembly, in this case illustrating the dolly component embodied as a catch assembly, and the hitch assembly embodied as a latch assembly.
Figure 13:
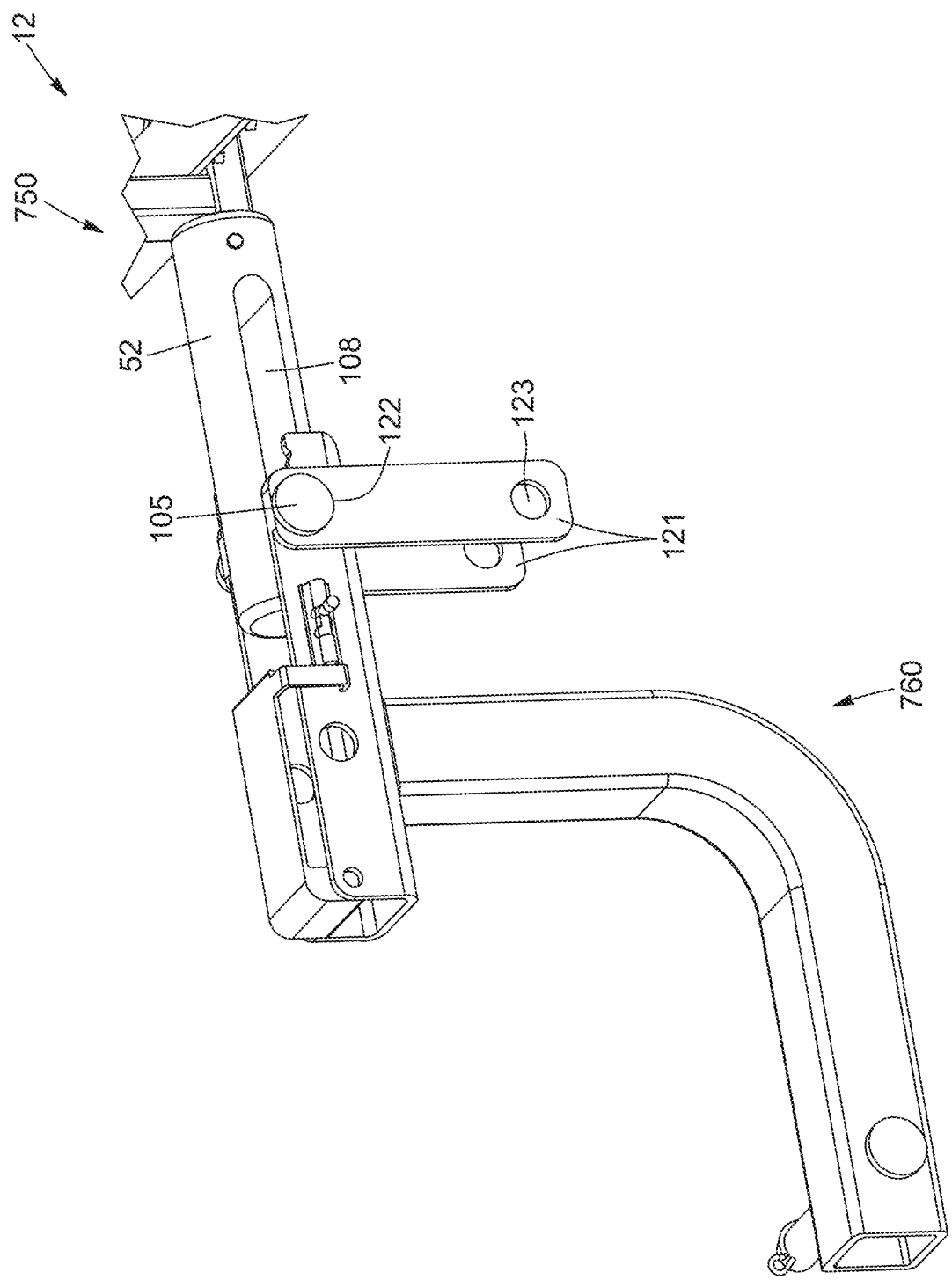
FIG. 13 is a rear perspective view illustrating a catch assembly being positioned over a latch assembly showing the dolly being moved in a transport position, in accordance with an embodiment.

Now referring to FIGS. 12 and 13, when the locking pin 104 is removed, for example by a user sliding the locking pin 104 out of engagement with the projection 52, the projection 52 is free to slide in the direction of the axis 54 while still being mounted to the latch assembly 60 by the rotation pin 105 as previously described. However, the projection 52 can pivot about a pin axis 110, defined by the rotation pin 105, in order to operate the dolly 12 in a manner that will be described further below.

The latch assembly 60 further includes a guide 120 to help guide and maneuver the dolly 12 as it is operated to adjust its configuration. In this embodiment, the guide 120 comprises two downwardly extending members 121 fixedly attached to the second end 64 of the latch assembly 60. The guide members 121 are provided with a first set of apertures 122 aligned with the rear housing apertures 107 and designed to receive the rotation pin 105 therethrough, and a second set of apertures 123 positioned at a lower end of the guide members 121 configured to receive the locking pin 104 to lock the catch assembly 50 in a predetermined configuration.

Figure 16:
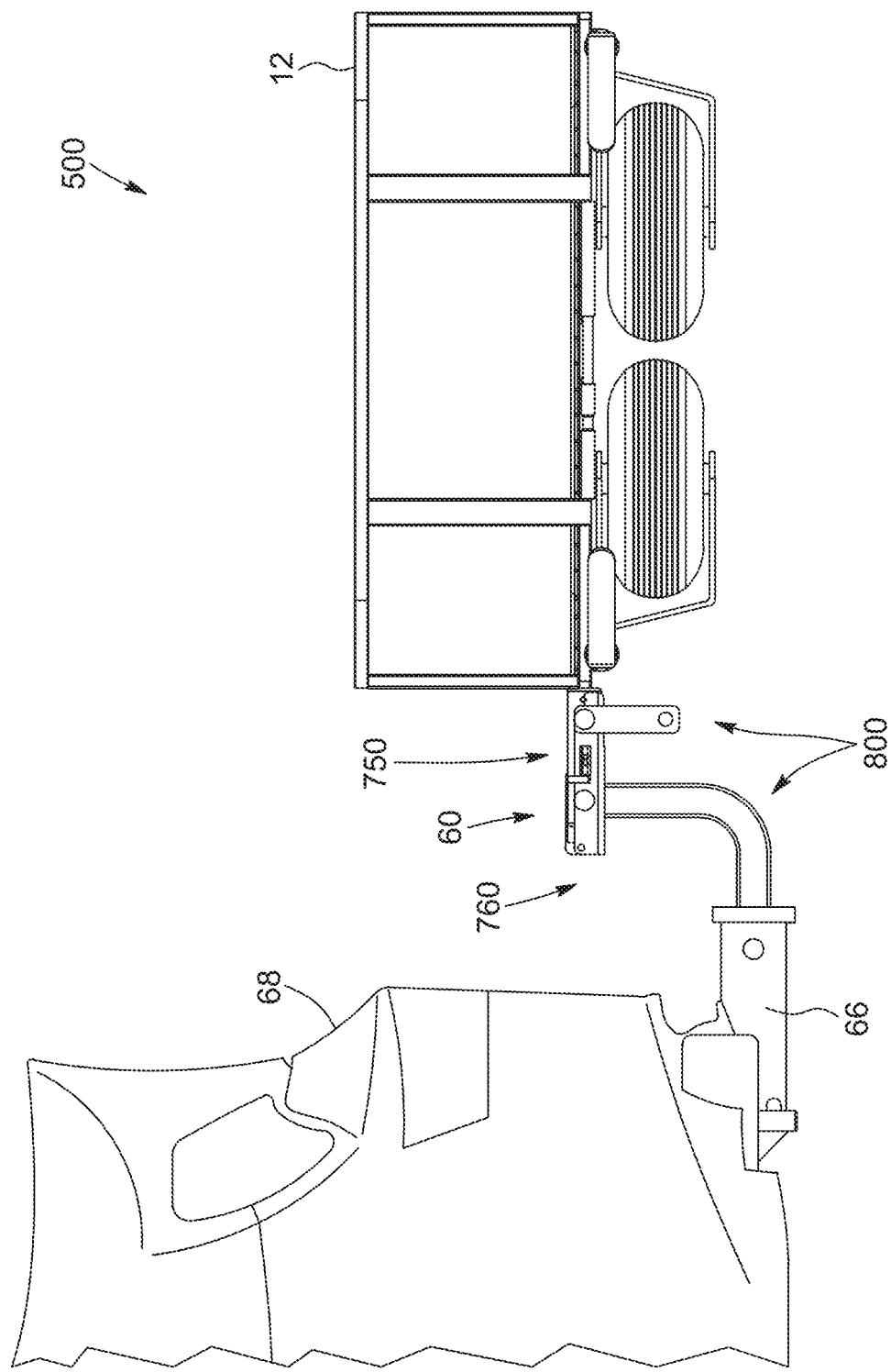
FIG. 16 is a side view showing the dolly latched to a vehicle in a loading position, in accordance with an embodiment.
Figure 17:
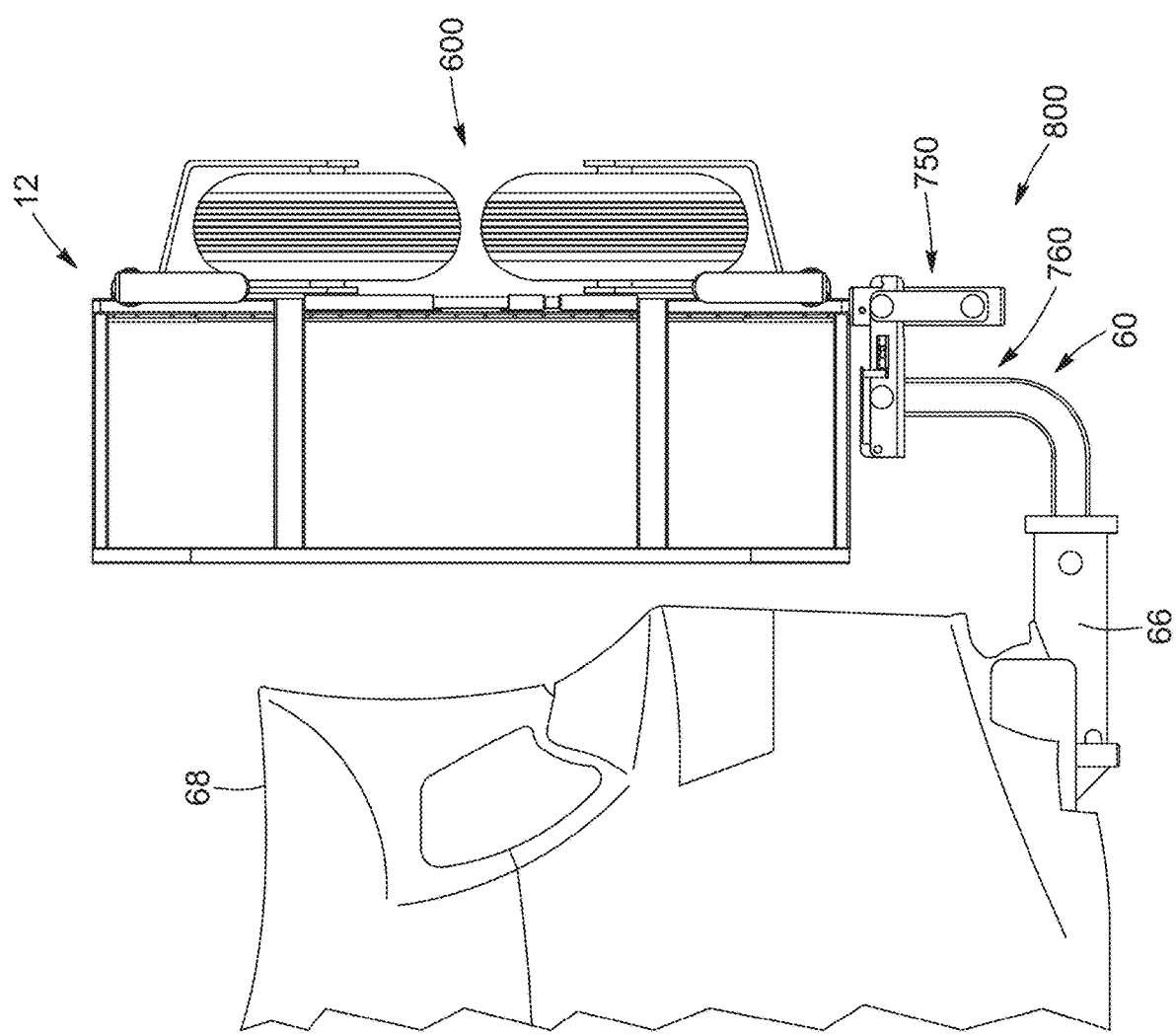
FIG. 17 is a side view showing the dolly latched to a vehicle in a transport position, in accordance with an embodiment.

In the illustrated embodiment, the orientation of the dolly 12 can be adjusted to facilitate loading and/or transportation of the dolly 12 while latched to the hitch 66 of a vehicle 68. With reference to FIGS. 12 through 17, the dolly 12 can be moved from a loading position 500 (as shown in FIG. 16), to a transport position 600 (as shown in FIG. 17). In the loading position, the support surface 20 is substantially parallel to the ground. However, when the dolly is in the transport position, the support surface 20 is positioned perpendicularly to the ground, thus allowing for a more compact way of transporting the dolly while attached to the hitch 66 of a vehicle 68. Preferably, when the dolly is in the loading position, the support surface 20 extends substantially at the same height as the trunk floor of the vehicle.

The orientation of the dolly 12 can be adjusted between the loading and transport positions 500, 600 by manually rotating the dolly 12 about the pin axis 110 of the rotation pin 105. A method for adjusting the dolly 12 between said positions will now be provided. In order to rotate the dolly 12 about the pin axis 110, the locking pin 104 must first be disengaged from the projection groove or slit 108 and from the U-shaped housing 80 as illustrated in FIG. 12. The top surface 91 of the pivotable flap 90 is designed to prevent early rotation of the projection 52 when the locking pin 104 is removed. The dolly 12 is then pulled outwardly/away from the vehicle until the projection groove 108 bottoms-out with the rotation pin 105. In this configuration, the projection 52 is free to rotate about the pin axis 110 of the rotation pin 105 (FIG. 13). Now referring to FIG. 14, the dolly 12 can then be lifted/rotated in an upward position so as to have the projection 52 be substantially vertical and thus aligned with the vertical guide 120 of the latch assembly 60. The dolly 12 can then be slid down in the direction of the vertical guide 120, until the projection groove 108 bottoms-out with the rotation pin 105 once more, thus aligning the second set of housing apertures 123 of the vertical guide 120 with the projection groove 108 allowing the locking pin 104 to be reengaged in the latch assembly 60 to effectively lock the dolly 12 in the transport position 600 (FIG. 15).

Figure 14:
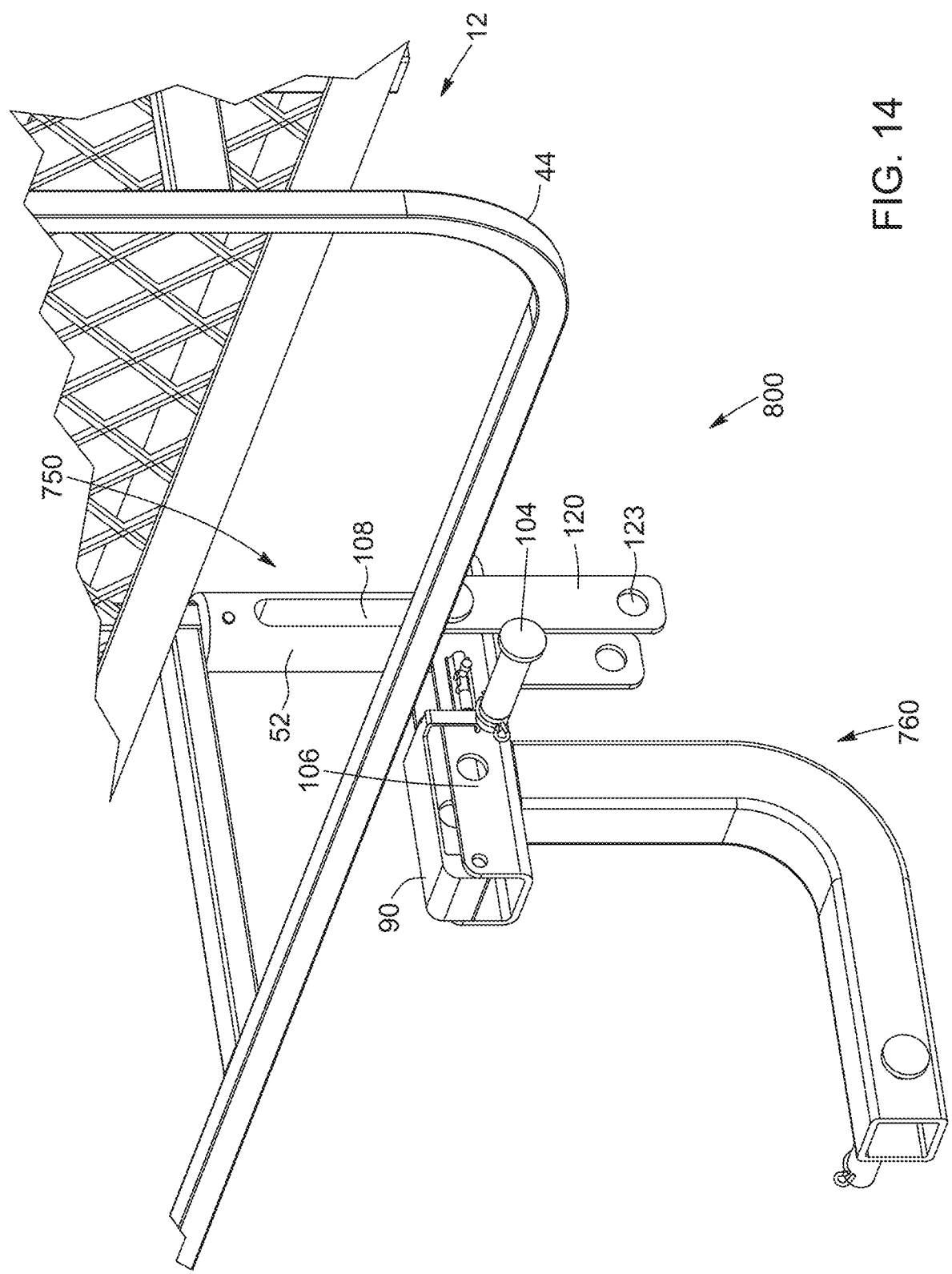
FIG. 14 is a rear perspective view illustrating a catch assembly positioned over a latch assembly showing the dolly being moved in a transport position, following the illustration in FIG. 13, in accordance with an embodiment.
Figure 15A:
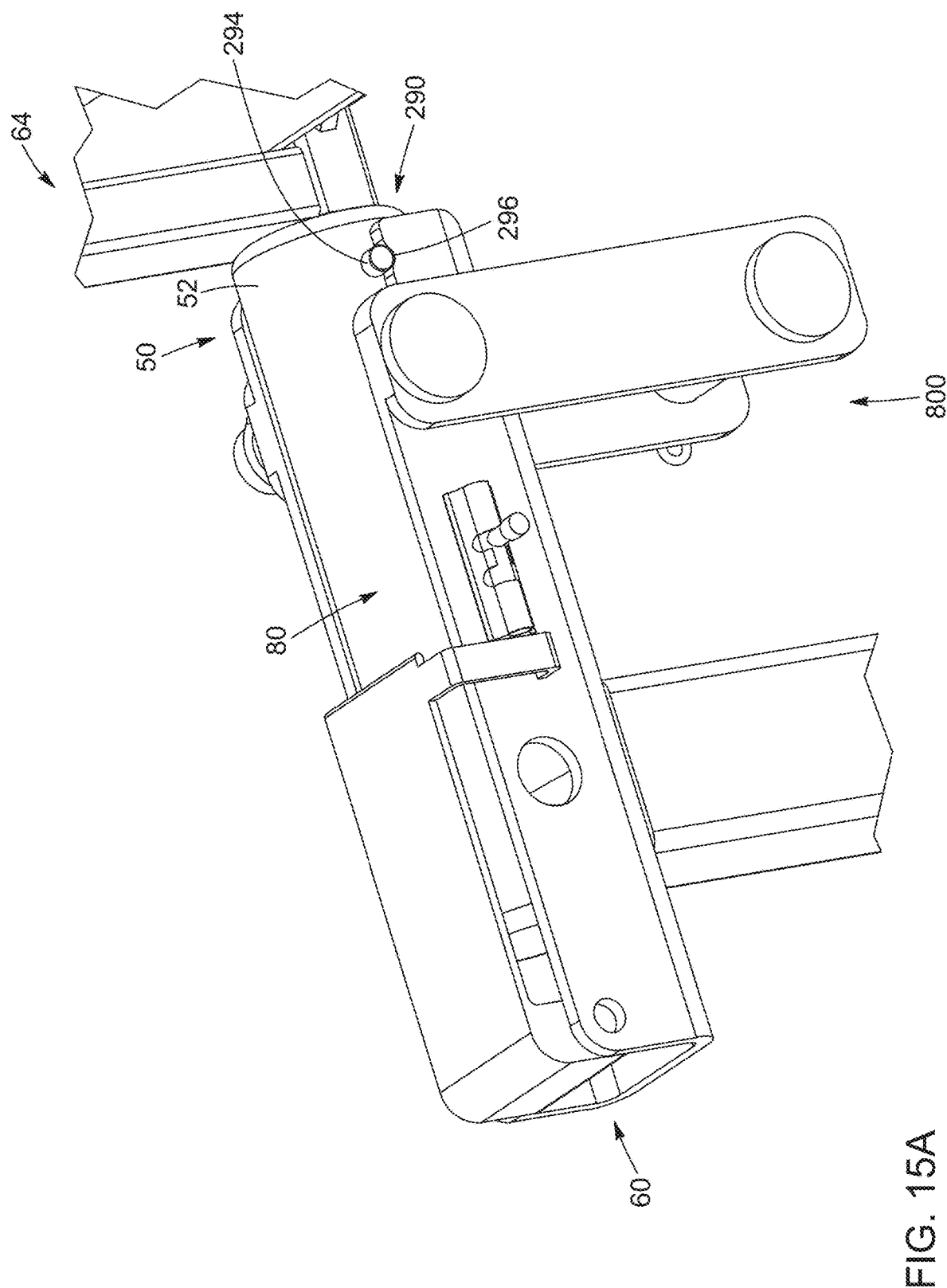
FIG. 15A is a side perspective view of the catch assembly, illustrating an anti-tilting mechanism.

Referring to FIGS. 14, 15 and 15A, when the latch assembly 60 is engaged with the catch assembly 50, the projection 52 is free to rotate about its axis within the U-shaped housing 80. The coupling of the projection 52 within the U-shaped housing 80 allows the projection 52, and thus the dolly 12, to be rotated about the axis 54 while ensuring that the projection 52, and thus the dolly 12, is unable to detach from the hold of the latch assembly 60. Once the latch assembly 60 and catch assembly 50 are so engaged, the dolly 12 may be easily pivoted about the projection 52, so that the wheels 32 are lifted from the ground until the support surface 20 is in a parallel plane with the ground. In this position 500, the locking pin 104 may be slideably engaged with the housing apertures 106 and corresponding projection apertures so as to fix the dolly 12 within the plane parallel to the ground. In such a position the dolly 12 is secured to the vehicle 68 and ready for transport. In this manner, both the dolly 12 and the object may be transported by the vehicle 68.

As best shown in FIG. 14, when the locking pin 104 is slideably disengaged from the housing apertures and projection groove 108, the dolly 12 is rotatable about the projection 52. The dolly 12 can be rotated from the resting position to a ramp position by rotating it in a counterclockwise direction (i.e. handle side), and into the operation position by rotating it clockwise (i.e. wheel side). When the dolly 12 is rotated counterclockwise about the projection 52, the front end 24 may be brought into contact with the ground and into a ramp position, thereby creating a ramp onto which the object may be moved thereon. Since optionally the rail 44 may not extend above the front end 24, the object may be slid or rotated onto the support structure 20 when the dolly 12 is in this ramp position. The locking pin 104 can then be engaged to lock the projection 52 in this angular position, for example by providing projection apertures (not shown) axially offset from the projection groove 108 such that the locking pin 104 will be able to pass therethrough unabated, to lodge the projection 52 in place within the U-shaped housing and thus maintain the dolly in the in the loading position.

In operation, an object may be loaded on the dolly 12 when in a resting position, that is when the dolly 12 is parallel to the ground, for example. The user may proceed to lift the dolly 12 using the handles 38 and tilt the dolly 12 into a position (i.e. operating position) which is convenient for the user to both support and push the dolly 12, so as to navigate the dolly 12 adjacent to the latch assembly 60. When the dolly 12 is in such a position, it may be maneuvered by the user so that the latch assembly 60 is aligned with the catch assembly 50, for example by positioning the dolly 12 in a tilted position above the latch assembly 60 such that when the dolly 12 is lowered towards the catch assembly 50 when in an open state, the projection 52 will illustratively enter through the open top 86 of the U-shaped housing 80 and into the space 88. The pivotable flap 90 may then be swiveled about the hinge 92 to close the open top 86, and the flap locking mechanism 96 may be engaged to lock the pivotable flap 90 in the closed state to thereby confine the projection 52 to the space 88. When the projection 52 is received through the open top 86 of the U-shaped housing 80, the pivotable flap 90 is moved from an open position to a closed position and locked in place using the flap locking mechanism 96, thereby preventing the projection 52 from exiting the confines of the U-shaped housing 80 during movement of the vehicle 68 or otherwise during transport of the dolly 12 and any object thereon.

Referring to FIG. 15A, in some embodiments, an anti-tilting mechanism 290 can be provided in order to limit rotation of the dolly in a particular direction. For example, the anti-tilting mechanism can be configured to prevent handle side rotation of the dolly 12 past the resting position. Such a mechanism can be useful, for example, when loading the dolly or securing it to a vehicle. In the illustrated embodiment of FIG. 15A, it is appreciated that the anti-tilting mechanism 290 can comprise a protruding member 294 removably engageable with the projection 52 of the catch assembly 50 and an abutting edge 296 positioned near the second end 64 of the latch assembly 60 designed to catch the protruding member 294. In the present embodiment, the protruding member 294 has a generally cylindrical form, although it can have any suitable shape or size that would allow the anti-tilting mechanism 290 to function appropriately.

As mentioned hereinabove and with reference to FIG. 8, in addition to FIG. 15A, when the latch assembly and the catch assembly are engaged, the projection 52 is free to rotate about the axis 54 while still being confined within the housing 80 of the latch assembly 60. When the dolly 12 rotates in the direction of the front end 24 of the frame 16, the protruding member 294 contacts the abutting edge 296 therefore preventing the dolly 12 from rotating further. Preferably, the protruding member 294 contacts the abutting edge 296 when the dolly 12 is in a substantially horizontal position or in the loading position 500. This configuration of the anti-tilting mechanism 290 can prevent unwanted tilting of the dolly 12, especially when an object is positioned on the support surface 20. Alternatively, other manners of preventing or blocking the rotation of the projection 52 may be provided, such as for example by providing a threaded pin (not shown) threaded through the housing apertures 106 which may be tightened to engage the projection 52 when received within the U-shaped housing 80. By thus preventing the rotation of the projection 52, the dolly 12 is also prevented from rotating.

Figure 18:
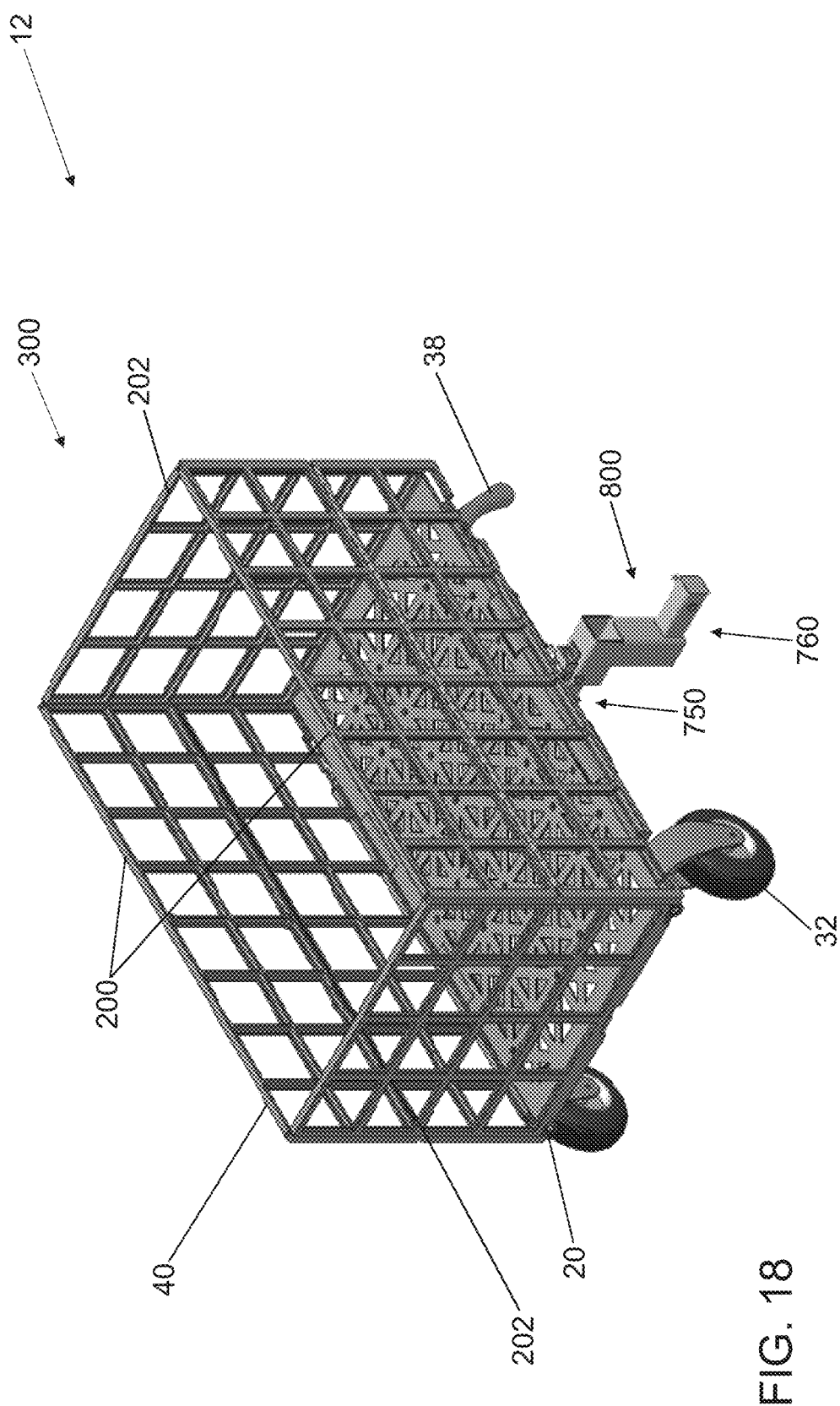
FIG. 18 is a rear perspective view of a dolly, in accordance with another embodiment, showing a dolly in an expanded configuration.
Figure 19:
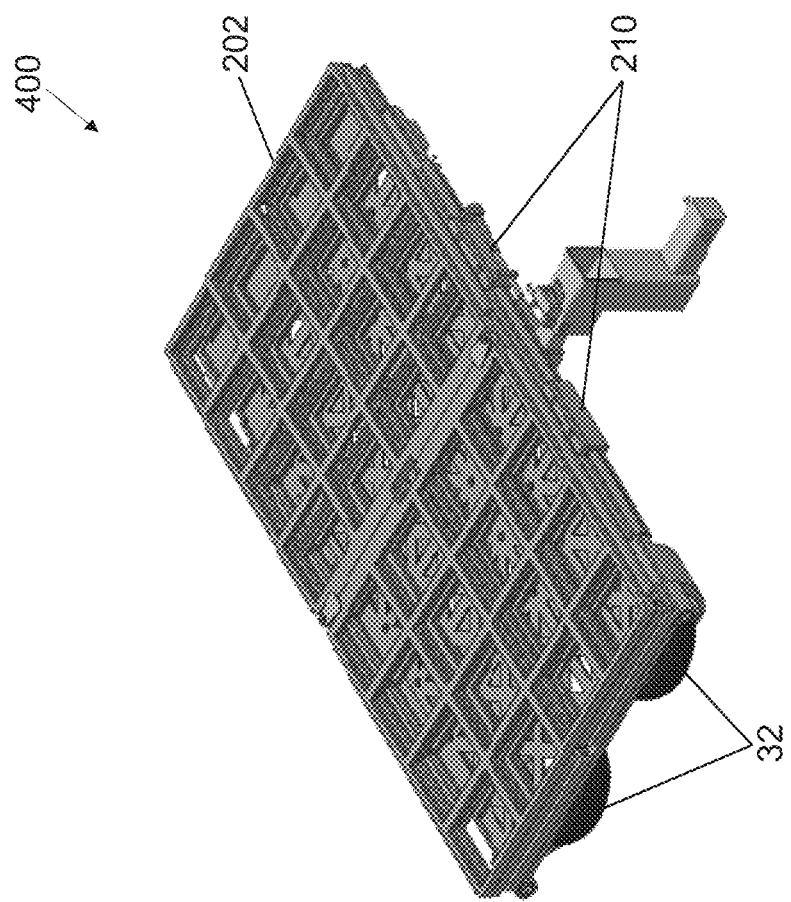
FIG. 19 is a rear perspective view of the doily of FIG. 18, showing the dolly in a collapsed configuration.

FIGS. 18 to 26 illustrate a dolly according to an alternate embodiment, in which the upstanding barrier 40 of the dolly 12 is collapsible, making it even more compact during transport. In other words, the dolly 12 can be operated between an expanded configuration 300 (as shown in FIG. 18) in which it is suitable for loading and transporting objects, and in a collapsed configuration 400 (as shown in FIG. 19) in which the dolly 12 takes up less space, for example by placing the upstanding barriers 40 flat and/or by folding the wheels 32 and/or handles 38 inwards. These features will be described in more detail hereinbelow.

In the illustrated embodiment, and as shown in expanded configuration 300 of the dolly 12 in FIG. 18, the barrier 40 comprises panels 200, 202 which extend away from the support surface 20 around a periphery thereof. The panels 200, 202 preferably extend substantially perpendicularly relative to the support surface 20. The dolly 12 is further provided with wheels 32 and handles 38, allowing its normal operation, as described above.

In this second embodiment of the dolly, the upstanding barrier 40 comprises two side panels 200 and two end panels 202. The side panels 200 are spaced apart from one another, and extend longitudinally along opposite sides of the support surface 20, whereas the end panels 202 extend between the side panels 200 at opposite ends thereof. In this configuration, the panels provide a boundary on all sides of the support surface 20, thereby confining objects 14 to the support surface 20 during transport or movement of the dolly 12.

Preferably, the upstanding barrier 40 is operable to disassemble and/or fold in order to shift the dolly 12 to the collapsed configuration 400. In the present embodiment, and as best shown in FIGS. 20 and 20A, the end panels 202 comprise tongues or protrusions 224 extending along opposite side edges. The protrusions 224 are adapted to slidably engage with side panels 200 via corresponding grooves or notches 226 (identified on FIG. 20A) located on opposite edges at the ends of said side panels 200. This tongue-and-groove engagement allows both end panels 202 to be slidably removed from the side panels 200, allowing the upstanding barrier 40 to be disassembled. It is appreciated that other configurations are also possible allowing the side and end panels 200, 202 to be removably engaged with one another.

In the present embodiment, side panels 200 are further configured to collapse and/or fold on themselves. The side panels 200 are each subdivided into a top section 204 and a bottom section 206 which are hingedly connected to one another. More specifically, a bottom edge of the top section 204 is engaged with a top edge of the bottom section 206 via a hinge 208. The side panels 200 are further hingedly connected the support surface 20 via at least one bottom hinge 210.

With reference to FIGS. 21, 22 and 22A, biasing mechanisms 212, 214 are provided to maintain the side panels 200 in an upright and substantially vertical position. In the illustrated embodiment, a first biasing mechanism 212 comprises a magnet 216 located within panel hinge 208. When the side panels 200 are upright (i.e. when top 204 and bottom 206 sections both extend vertically upward), the magnet 216 will prevent the hinge 208 from folding, and thus hold top section 204 in its upright orientation relative to the bottom section 206. Although a magnet is used in the present embodiment, it is appreciated that other biasing mechanisms can be used to retain the top section 204 of panel 200 upright relative to the bottom section 206. For example, the biasing mechanism 212 can include springs, snaps, etc.

A second biasing mechanism 214 is provide to retain the bottom section 206 of the panel 200 in an upright orientation relative to the support surface 20. The second biasing mechanism 214 comprises a holding pin 218 which is inserted in a hollow section 220 attached to the frame to prevent rotation of the bottom section 206 of panel 200 about the bottom hinges 210. A spring 222 is located on the holding pin 218 and keeps said holding pin 218 inserted in the hollow section 220. The holding pin 218 can be disengaged by pulling the holding pin out of the hollow section 220 and compressing the spring 222 to allow the bottom section 206 of panel 200 to rotate, allowing the bottom section 206 to fold onto the support surface 20. It is appreciated that other biasing mechanisms are also possible, for example clamps or other removable; detachable fasteners which can maintain the panels of the upstanding barrier substantially vertical and upright.

Now referring to FIGS. 23 to 23B, another possible example of a locking mechanism is used to block the rotation of the wheels. This locking mechanism comprises a longitudinal lock 260 and a rotational lock 270 respectfully designed to prevent longitudinal sliding of the shaft assembly 240 along the longitudinal axis 56, and rotational movement of the shaft assembly 240 about the longitudinal axis 56.

The longitudinal lock 260 is provided near the handle 38 and comprises a sliding bolt 262 and a locking section 264, the locking section being attached to the wheel shaft 242. The sliding bolt 262 is designed to slide between a locked position and an unlocked position. While the sliding bolt 262 is in the locked position, as also illustrated in FIG. 23A, the locking section 264 is positioned between the sliding bolt 262 and the frame element 19, effectively preventing longitudinal movement of the wheel shaft 242. Sliding the sliding bolt 262 in the unlocked position, allows longitudinal movement of the wheel shaft 242 and operation of the rotational lock 270, which will be described below.

As illustrated in FIG. 23B, the rotational lock 270 is provided at the second end 246 of the wheel shaft 242 and is comprised of a square shaft section 272 adapted to fit within a corresponding square slot section 274 located on the frame. When the square shaft section 272 is inserted into corresponding square slot section 274, the rotational movement of the wheel shaft assembly 240 about itself is prevented. To allow such rotational movement, the square shaft section 272 must be disengaged from the corresponding square slot section 274 by pulling the handle 38, and therefore the wheel shaft 242, towards the first end 244. It will be appreciated that the longitudinal lock 260 must first be disengaged before being able to disengage the rotational lock 270. It will also be appreciated that other shapes can be used for the rotational lock 270 to lock the rotational movement of the wheel shaft assembly 240, such as triangle or rectangle for example, or any shape having at least one flat surface.

Still referring to FIGS. 23 to 23B, to adjust the configuration of the wheel shaft assembly 240, the sliding bolt lock 262 must first be moved to the unlocked position to allow longitudinal movement of the wheel shaft 242 as described above. The handle 38 is then pulled towards the first end 244 of the wheel shaft 242 to disengage the square shaft section 272 from the square slot section 274 thereby allowing rotational movement of the wheel shaft assembly 240 about the longitudinal axis. Once rotated in the desired configuration, the handle 38 is pushed towards the second end 246 of the wheel shaft 242, sliding the square shaft section 272 back into the square slot section 274 and engaging the rotational lock 270. The longitudinal lock 260 is then also re-engaged by sliding the sliding bolt 262 back in the locked position, preventing further movement of the wheel shaft assembly 240.

With reference to FIGS. 18, 19 and 20, to adjust the dolly 12 from the expanded configuration 300 to the collapsed configuration 400, both end panels 202 can be pulled upwardly in order to slide the protrusions 224 from corresponding notches 226, thus disengaging both end panels 202 from the side panels 200. Once the end panels 202 are removed, the side panels 200 are free to collapse/fold on themselves. Provided with enough force to disengage the first biasing mechanism 212, the top section 204 can rotate about the top hinge 208 to fold the panel 200 in half (i.e. fold the top section 204 onto the bottom section 206), After disengaging the second biasing mechanism 214, the bottom section 206 can rotate about the bottom hinge 210 allowing the side panel 200 to lie flat on the support surface 20. When both side panels 200 are collapsed upon the support surface 20, both end panels 202 can then be stacked or placed on top of the side panels 200. Once stacked, the panels 202 can be locked in place via a locking mechanism 230.

In the present embodiment, and as illustrated in FIG. 24-24A, the locking mechanism 230 comprises a flat fixture 232 engageable with protrusions 234 on the panels 200,202 of the dolly 12. The flat fixture 232 can be held securely in place with a screw 236, but can be easily held in place by other fastening means such as a strap or a clamp.

It is appreciated that other configurations are possible to allow the dolly to collapse. In a possible embodiment, the side panels 200 can be designed to be slideably removable from the end panels 202 and said end panels can collapse/fold upon the support surface 20. In another possible embodiment, all four panels of the upstanding barrier can collapse upon themselves to adjust the upstanding barrier from the expanded configuration to the collapsed configuration.

As can be appreciated, folding and disassembling the upstanding barrier 40 in the collapsed configuration 400 of the dolly 12 allows the dolly 12 to take up less space, making it more suitable for transport. It is appreciated that other parts of the dolly can be collapsed and/or disassembled as well, in order to have the dolly 12 take up even less space. For example, wheels and handles can be folded inwards for convenient storage or transport of the dolly when latched to a vehicle.

According to an embodiment, the dolly attachment assembly 10 can be configured to allow adjusting an orientation of the dolly 12 to facilitate loading and/or transport of the dolly while latched to the hitch of a vehicle. With reference to FIGS. 25 and 26, in the present embodiment, the latch assembly 60 comprises a hinge which allows the dolly to be moved between the loading position 500, illustrated in FIG. 25, and the transport position 600, illustrated in FIG. 26, when the upstanding barrier 40 is collapsed. In the loading position 500, the support surface 20 is substantially parallel to the ground and the upstanding barrier 40 can be expanded/unfolded as described hereinabove. When the dolly is in the transport position 600, the support surface 20 is substantially perpendicular to the ground, thus allowing for a more compact way of transporting the dolly while attached to the hitch of a vehicle.

In the embodiments of FIGS. 25 and 26, the orientation of the dolly 12 can be adjusted between the loading position 500 and the transport position 600 by manually rotating the dolly about a hinge located on the latch assembly 60. The latch assembly 60 is further provided with safety pins 282 to block rotation of the dolly about said hinge, locking the dolly in a desired position. The position of the dolly can be adjusted, by pulling the safety pins 282 out of the latch assembly 60, manually adjusting the orientation of the dolly, and reinserting the safety pins 282 in the latch assembly.

In this alternate embodiment of the dolly, an anti-tilting mechanism 290 is also provided. Referring to FIGS. 25, 26 and 26A, the anti-tilting mechanism 290 comprises a bar 292 (identified on FIG. 26) extending from latch assembly and positioned to abut an underside of the dolly. For example, the anti-tilting bar 292 can be attached to, and extend from, a side of the U-shaped housing. In the present embodiment, the anti-tilting bar 292 is hollow and has a square cross-section, but other configurations are also possible. For example, the anti-tilting bar 292 could be a solid tube.

Referring to FIGS. 1 to 26, the method of operating the dolly 12 will be described. The dolly is especially adapted for loading one or more objects from the dolly onto a vehicle provided with a hitch. A user can first load objects on the support surface 20 of the dolly 12, when the dolly is in a resting position, such as shown in FIG. 1. The dolly is preferably configurable between embodiments such as shown in FIG. 1, with two wheels on one end and two handles on the other ends, or embodiments such as shown in FIG. 4 or 5, where pairs of wheels are provided at each end of the dolly. Regardless of the wheel configuration (one, two or four wheels), the dolly comprises a connection assembly for connecting and disconnecting the dolly to the vehicle hitch. Once objects have been placed on the support surface, the user rolls the dolly near the vehicle, and inclines the support surface until the connection assembly is aligned with the vehicle hitch. The user then connects the connection assembly to the vehicle hitch, for example by inserting the first end of the hitch assembly in the hitch, and/or by inserting the projection 52 onto the second end of the hitch assembly. Preferably, the hitch assembly will have been previously inserted or connected to the hitch. By simply raising the dolly component, such as the projection 52, in line with the first segment 766b of the hitch/latch assembly, the dolly 12 can be easily connected to the vehicle. The user can then pivot the dolly 12 to position the support surface 20 parallel to the ground, in a loading position, without having to support the entire weight/load of the dolly. The user can then unload the object(s) from the dolly and into to the vehicle, which as in the trunk. Once all objects have been unloaded, the user can simply pivot the dolly toward the vehicle in the transport position, by positioning the support surface vertically relative to the ground, for transporting the dolly with the vehicle once the object has been loaded onto the vehicle. As explained previously, this can be done by pivoting the projection 52 about the rotation pin 105, and by moving the locking pin from the first segment 766b to the second segment 766a. Depending of the dolly's configuration, the method may include optional steps of storing the at least one wheel underneath the support surface of the dolly and/or collapsing barriers or side panels/walls onto the support surface, rendering the doily more compact for transportation.

It will be appreciated from the foregoing disclosure that there is provided a dolly attachment assembly, which facilitates the inexpensive and rapid connection of a dolly to a vehicle hitch for providing a dual use platform for transporting an object. Of course, the scope of the claims should not be limited by the preferred embodiments set forth in the examples but should be given the broadest interpretation consistent with the description as a whole.

The invention claimed is:

1. A dolly for attachment to a vehicle hitch, comprising:
a support assembly including a support surface, the support assembly comprising two ends and two lateral sides;
two wheel shafts operatively connected to the support assembly and pivotable relative to the support surface between an operating position and a collapsed position, each wheel shaft comprising a wheel at a first end thereof and a handle or a second wheel at a second end thereof, the wheels extending away from the support surface when the corresponding wheel shaft is in the operating position, the wheels lying flat along the support surface when the corresponding wheel shaft is in the collapsed position;
a connection assembly comprising a dolly component and a hitch component, the hitch component having one end connectable to the vehicle hitch and a second end removably engageable with the dolly component, the dolly component being operatively connected to the support assembly, the connection assembly allowing, when the dolly and hitch components are engaged, and the hitch component is connected to the vehicle hitch, movement of the dolly from a ramp position to a loading position wherein:
in the ramp position, the support surface is inclined relative to a ground surface,
in the loading position, the support surface is parallel and raised above the ground surface; and
movement of dolly from the loading position to a transport position wherein:
in the transport position, the support surface extends vertically relative to the ground surface, for transporting the dolly.

2. The dolly according to claim 1, wherein the movement of the dolly from the ramp position to the loading position is a pivoting movement about a first axis which extends along a length of the vehicle.

3. The dolly according to claim 2, wherein the movement of the dolly from the loading position to the transport position is a rotational movement about a second axis which extends along a width of the vehicle, the first axis being perpendicular to the second axis.

4. The dolly according to claim 3, comprising a locking mechanism operable to lock the dolly in at least one of the loading position and the transport position.

5. The dolly according to claim 4, wherein:
the dolly component comprises a projection extending from one of the lateral sides of the support assembly parallel to the first axis, and
the second end of the hitch component, which is removably engageable with the dolly component, comprises two segments at angle:
a first segment extending parallel to the first axis when the first end of the hitch component is connected to the hitch, the projection being secured to the first segment via the locking mechanism when the dolly is in the loading position;
a second segment extending perpendicular to the first segment, the projection being secured to the second segment via the locking mechanism when the dolly is in the transport position.

6. The dolly according to claim 5, wherein the projection comprises a projection groove, the connection assembly comprising a rotation pin insertable through the projection groove to guide rotation of the projection when moving the dolly between the loading and the transport position, and a locking pin insertable through the projection groove to secure the projection to the first segment or the second segment, depending on whether the dolly is in the loading position or in the transport position.

7. The dolly according to claim 3, comprising an anti-tilting bar to restrict rotational movement of the dolly about the axis of the projection in one direction.

8. The dolly according to claim 3, wherein the connection assembly comprises a latch assembly and a catch assembly wherein:
the dolly component of the connection assembly corresponds to the catch assembly and is operatively secured to the support assembly, the catch assembly comprising a projection defining a projection axis; and
the hitch component of the connection assembly corresponds to the latch assembly comprising a first end and a second end, wherein the second end is configured to removably latch onto the catch assembly, where the hitch component is adapted to pivot about the projection axis to enable rotation of the dolly.

9. The dolly according to claim 8, wherein the latch assembly comprises a clamp engageable with the catch assembly, the clamp comprising a locking mechanism configured to secure the projection within the latch assembly.

10. The dolly according to claim 9, wherein the support assembly comprises at least one upstanding barrier for confining the object to the support surface, the at least one upstanding barrier being collapsible onto the support surface, the dolly being configurable between a deployed configuration wherein the at least one upstanding barrier is raised, and a collapsed configuration, wherein the at least one upstanding barrier is lowered on the support surface.

11. The dolly according to claim 1, wherein each wheel is part of a wheel assembly, the wheel assembly being configurable between a rolling position and a stored position.

12. The dolly according to claim 11, wherein each wheel defines a wheel axis, and wherein in the rolling position, the wheel axis extends parallel to the support surface, and in the stored position, the wheel axis extends perpendicular to the support surface.

13. The dolly according to claim 1, wherein said at least one wheel comprises four wheels, the dolly comprising two wheel shafts pivotally secured on the support assembly, each wheel shaft comprising a pair of wheels, the wheel shafts being pivotable between an operating position in which the pair of wheels extend away from the support surface, and a collapsed position in which the pair of wheels lie flat along the support surface.

14. The dolly according to claim 1, wherein at least one of the hitch component and the dolly component of the connection assembly is configurable between an extended configuration and retracted configuration, for positioning the dolly closer or farther away from the vehicle, when the dolly is connected to the hitch.

15. The dolly according to claim 14, wherein at least one of the hitch component and dolly component of the connection assembly comprises a telescoping member, configurable between the extended and the retracted configuration, for spacing the dolly closer or farther away from the vehicle, when the dolly is connected to the hitch.

16. The dolly according to claim 15, comprising a handle assembly operatively connected to the support assembly, the handle assembly comprising a handle arm pivotally connected at one of the ends of the support assembly, and configurable between a stored position where the handle arm is slid under the support surface, substantially parallel thereto, and a deployed position where the handle arm extends away from the support assembly, therefore allowing the handle arm to be grasped.

17. The dolly according to claim 16, wherein the connection assembly is sized and configured such that when the dolly is in the loading position, the support surface extends substantially at the same height as a trunk floor of the vehicle.

18. A dolly for attachment to a vehicle hitch, for facilitating loading of an object from the dolly onto a vehicle, and transport of the dolly by the vehicle once the object has been loaded onto the vehicle, the dolly comprising:
 a support assembly including a support surface for supporting an object, the support surface comprising two ends and two lateral sides;
 two wheels operatively connected near one of the ends of the support surface;
 a connection assembly operable to:
  connect and disconnect the dolly to the vehicle hitch; and
  enable movement of the dolly relative to the vehicle and a ground surface, when the dolly is connected to the vehicle hitch, the dolly being movable between :
   a ramp position, where the support surface is inclined to enable the wheels to contact the ground surface;
   a loading position, where the wheels are raised above the ground surface and the support surface is parallel to the ground surface to facilitate loading the object from the dolly to the vehicle; and
   a transport position, where the support surface is upright and extends perpendicular to the ground surface along a rear of the vehicle to enable transporting the dolly with the vehicle, once the object has been loaded in the vehicle.

19. A dolly comprising:
 a frame having lateral sides, a front end and a rear end;
 two wheels provided at the front end of the frame;
 a handle provided at the rear end of the frame;
 a support assembly connected to the frame, the support assembly comprising a support surface for supporting an object and a barrier or wall for confining the object on the support surface;
 a catch secured to the frame, the catch comprising a projection defining an axis;
 a latch assembly comprising a first end and a second end, the first end being connectable to a trailer hitch and the second end being configured to removably latch with the catch and to allow rotational movement of the dolly about the axis of the projection, the latch assembly and the dolly being hingedly attached to one another allowing the dolly to be adjusted between a loading position in which the support surface is horizontal and a transport position in which the support surface is vertical; and
 a locking mechanism for locking the dolly in the loading position and in the transport position.

20. The dolly according to claim 19, wherein the barrier or wall is collapsible.

21. The dolly according to claim 19, wherein the wheels are pivotable and collapsible, underneath the frame.

* * * * *